US008593672B2

(12) United States Patent
Aoyama et al.

(10) Patent No.: US 8,593,672 B2
(45) Date of Patent: Nov. 26, 2013

(54) INFORMATION EQUIPMENT APPARATUS

(75) Inventors: Motoaki Aoyama, Hino (JP); Shunichi Kumakura, Hachioji (JP); Yukio Watanabe, Hachioji (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 596 days.

(21) Appl. No.: 12/769,092

(22) Filed: Apr. 28, 2010

(65) Prior Publication Data

US 2010/0277763 A1 Nov. 4, 2010

(30) Foreign Application Priority Data

May 1, 2009 (JP) .................................. 2009-112325
May 1, 2009 (JP) .................................. 2009-112338

(51) Int. Cl.
*G06F 3/12* (2006.01)
*G03G 15/00* (2006.01)

(52) U.S. Cl.
USPC .......................... 358/1.15; 358/1.13; 399/81

(58) Field of Classification Search
None
See application file for complete search history.

(56) References Cited

U.S. PATENT DOCUMENTS

| 5,091,746 | A  | * | 2/1992 | Watanabe ........................ 399/83 |
| 5,543,897 | A  | * | 8/1996 | Altrieth, III ...................... 399/81 |
| 5,796,827 | A  | * | 8/1998 | Coppersmith et al. ........ 713/182 |
| 6,421,135 | B1 | * | 7/2002 | Fresk et al. .................. 358/1.15 |
| 6,698,950 | B2 | * | 3/2004 | Nishii ............................. 400/63 |
| 7,542,720 | B2 | * | 6/2009 | Yoda et al. ................... 455/41.1 |
| 2003/0038965 | A1 | * | 2/2003 | Simpson et al. ............. 358/1.15 |
| 2004/0041834 | A1 | * | 3/2004 | Wegeng et al. ............... 345/740 |
| 2004/0161257 | A1 | * | 8/2004 | Ishihara .......................... 399/81 |
| 2006/0239421 | A1 | * | 10/2006 | Ishibashi et al. ........... 379/88.13 |
| 2007/0129864 | A1 | * | 6/2007 | Tanaka et al. .................. 701/36 |
| 2008/0239357 | A1 | * | 10/2008 | Matsushima ................ 358/1.13 |
| 2008/0294722 | A1 | * | 11/2008 | Park et al. ..................... 709/204 |
| 2009/0079845 | A1 | * | 3/2009 | Yanagidate ................ 348/222.1 |
| 2009/0316186 | A1 | * | 12/2009 | Higashi et al. .............. 358/1.15 |

FOREIGN PATENT DOCUMENTS

| JP | 2002-152145 | 5/2002 |
| JP | 2002-222169 | 8/2002 |
| JP | 2004-034582 A | 2/2004 |
| JP | 2004-077990 A | 3/2004 |

(Continued)

OTHER PUBLICATIONS

Office Action (Notice of Reasons for Refusal) dated Mar. 9, 2011, issued in the corresponding Japanese Patent Application No. 2009-112325, and an English Translation thereof.

(Continued)

*Primary Examiner* — King Poon
*Assistant Examiner* — Vincent Peren
(74) *Attorney, Agent, or Firm* — Buchanan Ingersoll & Rooney PC

(57) ABSTRACT

An information equipment apparatus provided with: an operation section; a communication section which carries out communication with a terminal apparatus storing identification data of an operator related to an operation in the operation section, by using a human body of the operator as a communication path; and a control section which, in coordination with a detection of the operation in the operation section, executes an identification of the operator based on the identification data by carrying out communication with the terminal apparatus via the communication section, and according to a result of the identification, controls a control operation corresponding to the operation in the operation section.

13 Claims, 16 Drawing Sheets

(56) References Cited

FOREIGN PATENT DOCUMENTS

| | | |
|---|---|---|
| JP | 2006-081025 A | 3/2006 |
| JP | 2006-231554 | 9/2006 |
| JP | 2008-197753 | 8/2008 |
| JP | 2008-271499 | 11/2008 |
| JP | 2009-027482 | 2/2009 |
| JP | 2009-069994 | 4/2009 |
| WO | WO 2007/018151 | 2/2007 |

OTHER PUBLICATIONS

Office Action issued by Japan Patent Office on Dec. 27, 2012 in corresponding Japanese Patent Application No. 2009-112338, and translation thereof.

* cited by examiner

INFORMATION EQUIPMENT APPARATUS

CROSS REFERENCE TO RELATED APPLICATION

This application is based on Japanese Patent Application No. 2009-112325 and No. 2009-112338 respectively filed on May 1, 2009 and May 1, 2009 with Japanese Patent Office, the entire content of which is hereby incorporated by reference.

BACKGROUND OF THE INVENTION

1. Technical Field

The present invention relates to information equipment apparatus that identifies operators using human body communication.

2. Prior Art

The number of persons that can be authenticated at one time is only one person in the general purpose individual person authentication (user authentication) in image forming apparatuses, etc., for example, in password authentication or card authentication, or biometric information authentication such as fingerprint, veins, etc. Normally, the control operations are made so that the single operation section provided in the apparatus body is released to the authenticated user and various types of operations are received.

In detailed terms, when the image forming apparatus receives a prescribed authentication operation (login operation) and authenticates the user, the use of the apparatus is permitted, the authenticated state (the login state) is maintained, and control operations are made assuming that the different successive operations received by the operation section are being made by that authenticated user. Change of the user, etc., is being recognized by the authentication releasing operation (the logoff operation) of the current user and the authentication operation by the next user thereafter, or by the authentication switching operation (login switching operation) by pressing a prescribed button, etc. Further, in order to ensure security in cases such as when the user goes away from the apparatus without carrying out the authentication releasing operation, etc., even the function of automatically releasing the authentication state when a prescribed interval of time has elapsed in the no operation condition (the automatic logoff function), etc., is also very common.

In the individual person authentication and print management (print control) in the image forming apparatus, various technologies have been proposed related to security, operability, manageability, etc.

For example, in Japanese Unexamined Patent Application Publication No. 2004-77990 (Patent Document 1), a technology has been disclosed wherein fingerprint authentication mechanism is incorporated in the sleep release switch or the power supply switch of the image forming apparatus, by carrying out individual person authentication by fingerprint verification along with the operation of pressing down that specific switch, this technology aims to achieve both security and operability at the time of operating a specific function. In Japanese Unexamined Patent Application Publication No. 2004-34582 (Patent Document 2), a technology has been disclosed wherein, by managing using operation section IDs set individually for a plurality of operation sections that are connected wirelessly to the body of the apparatus, print management has been made possible for each operation section.

An image forming apparatus, etc., that is provided with a general purpose individual person authentication function (user authentication function), such as password authentication, card authentication, or biometric information authentication such as fingerprint, veins, etc., generally, when the user is authenticated by a prescribed authentication operation, the use of the apparatus is permitted and the authentication state is maintained, and the control operations are made assuming that the different successive operations received by the operation section are being made by that authenticated user.

In the individual person authentication and data communication in the image forming apparatus, etc., various technologies have been proposed related to security, operability, etc.

For example, in Japanese Unexamined Patent Application Publication No. 2006-81025 (Patent Document 3), a technology has been disclosed that enhances operability (simplicity of connection) and security (data confidentiality) in data communication using human body communication, in a human body communication system in which the data communication between a data supply source installed in a shop such as a consumable items purchasing apparatus, a driver purchasing apparatus, or an information terminal apparatus installed by a manufacturer, etc., and an image forming apparatus such as an ink jet printer, etc., which becomes the data receiver is carried out via a data transmitter and receiver worn on the body of the user, by carrying out fingerprint verification or vein verification at the time that the user touches the touching part of the apparatus for carrying out data transfer by human body communication between the data transmitter and receiver and the apparatus.

As has been described above, since the conventional individual person identification by card authentication or biometric information authentication recognizes the operations made after authentication as those made by that authenticated user, the number of persons that can be managed at the same time is only one person, and it was cumbersome because it was not possible to switch users unless the authentication state of one user has been released. Further, it is likely that the operations made by another person after authenticating one person are handled as the operations made by the authenticated person, there was margin for improvement in security aspects.

In the technology of Patent Document 1 of adding fingerprint verification mechanism to the switches of specific functions, it is not possible to directly identify the person operating other switches or touch panel. Because of this, it is inevitable that the operations of these operation members are handled as having been made by the user authenticated at the time of operating specific function switches, and eventually, only one authenticated user can be managed at the same time by the apparatus, and it is not possible to allow a plurality of users to use the apparatus simultaneously. Further, if the operations of other operation members are handled as the operations by the user who was authenticated at the time of operation of switches of specific functions, it is likely that the operations made by another person of those operation members are handled as the operations made by the authenticated person, there was also a problem in security aspects.

In the technology of Patent Document 2 which makes it possible to carry out print management of a plurality of operation sections, it is merely managing the operations for each operation section ID, and if we pay attention to the individual operation sections, the number of persons that can be managed at the same time is only one person. Because of this, in units of an operation section, an operation of releasing the authentication or a switching operation, etc., is necessary for switching between users, and not only the switching of users is cumbersome, but also, it is likely that the operations made by another person in the authenticated state are handled as the operations made by the authenticated person, there was also a problem in security aspects.

As has been explained above, in the conventional individual person authentication by image forming apparatus, etc., since the operations received from an operation section in the authenticated state are recognized as the operations made by the authenticated user himself or herself, it is not possible to recognize distinctly the operations by an authenticated user and other operations. For example, even unintentional operations (erroneous operations) caused by some object falling on the operation section or by the edge part of a document touching the operation section, etc., or the operations made by some other person while the authenticated user has temporarily gone away from the apparatus (identity theft operations) are likely to be recognized wrongly as having been made by the authenticated user.

In the technology of Patent Document 1 of adding fingerprint verification mechanism to the switches of specific functions, although it is possible to consider preventing erroneous recognitions such as the above by incorporating fingerprint authentication mechanisms in all the operation members, if the number of operation members becomes large, there are the problems that the mounting layout becomes difficult, and the cost becomes high.

The same is also true even in the case of the technology of Patent Document 3 wherein individual person authentication by fingerprint authentication, etc., has been combined with data communication utilizing human body communication, and for example, even if erroneous recognitions such as the above are prevented by incorporating fingerprint authentication sensor, etc., in all operation members of all operation sections in which a plurality of operation members have been provided, again there are the problems that the mounting layout of operation members and fingerprint authentication sensors becomes difficult, and the cost becomes high.

In these Patent Documents 1 and 3, if an attempt is made to prevent erroneous recognition of operation, in either case, there is the problem that the configuration of the interface with the operator that becomes necessary for identifying the operator becomes complex.

The present invention was made for solving the above problems, and an object of the present invention is to provide an information equipment apparatus that, without having to carry out a special operation and change the authentication state of operators between operations, can carry out control operations according to the operator of the received operation.

Further, another object of the present invention is to provide an information equipment apparatus wherein it is possible to simplify the configuration of the interface with the operator for identifying the operator and to prevent erroneous recognition of operations.

SUMMARY

To achieve at least one of the abovementioned objects, an information equipment apparatus reflecting one aspect of the present invention are as follows.

[1] An information equipment apparatus including: an operation section; a communication section which carries out communication with a terminal apparatus storing identification data of an operator related to an operation in the operation section, by using a human body of the operator as a communication path; and a control section which, in coordination with a detection of the operation in the operation section, executes an identification of the operator based on the identification data by carrying out communication with the terminal apparatus via the communication section, and according to a result of the identification, controls a control operation corresponding to the operation in the operation section.

[2] An information equipment apparatus according to [1] above wherein, in addition to correlating the control operation to an identified operator and controlling the control operation corresponding to the operation received from the identified operator, the control section executes the identification with respect to an operator of a newly received operation during controlling the control operation.

[3] An information equipment apparatus according to [2] above wherein the control section changes the control operation corresponding to the newly received operation, depending on whether or not the operator of the newly received operation is same as the operator correlated to the control operation being controlled.

[4] An information equipment apparatus according to [2] or [3] above wherein, in cases where a first operator that is the operator of the newly received operation is not same as a second operator that is the operator correlated to the control operation being controlled, the control section cancels the control of the control operation correlated to the second operator and starts control of the control operation related to the first operator.

[5] An information equipment apparatus according to [2] or [3] above wherein said control section, when the first operator which is the operator of said newly received operation is not the same as the second operator which is the operator related to the control operations being managed, compares the priority levels of said first operator and of said second operator, and based on the result of this comparison, carries out on a priority basis the control operations related to either one of the operators of said first operator and said second operator.

[6] An information equipment apparatus according to [2] or [3] above wherein, in cases where a first operator that is the operator of the newly received operation is not same as a second operator that is the operator correlated to the control operation being controlled, the control section compares priority levels of the first operator and the second operator, and based on a result of this comparison, carries out on a priority basis the control operations related to either one of the first and second operators.

[7] An information equipment apparatus according to [2] or [3] above wherein the control section inspects whether or not coordinated operations are being executed with respect to prescribed control operations, which a plurality of operators need to execute in coordination with each other.

[8] An information equipment apparatus according to any one of [1] to [7] above wherein a plurality of operation sections including the operation section are provided.

[9] An information equipment apparatus according to [2] or [3] above wherein a plurality of operation sections including the operation section are provided, and wherein the control section accepts the operation received from the operator in a second operation section, during the control of the control operation related to the operation received from the operator in a first operation section, as an operation from the operator for the control operation being controlled.

[10] An information equipment apparatus according to any one of [8] or [9] above wherein among the plurality of operation sections, at least one operation section is configured as a separate unit from an apparatus body of the information equipment apparatus and is connected with wireless communication.

[11] An information equipment apparatus provided with, an operation section; a communication section which carries out communication with a terminal apparatus by using a human body of an operator related to an operation of the operation section as a communication path; and an antenna, which is connected to the communication section, and is placed at a position where the human body of the operator forms the communication path between the communication section and the terminal apparatus.

[12] An information equipment apparatus according to [11] above wherein the operation section is an operation panel comprising a panel body and a plurality of operation members provided on a surface of the panel body, and the antenna is placed on the surface of the operation panel.

[13] An information equipment apparatus according to [12] above the plurality of operation panels comprises at least one of a touch panel or a button.

[14] An information equipment apparatus according to [12] or [13] above wherein the antenna is placed so as to cover the plurality of operation members.

[15] An information equipment apparatus according to [12] or [13] above wherein the antenna is placed on the periphery of the plurality of operation members.

[16] An information equipment apparatus according to [11] above wherein said antenna is placed at a position in the neighborhood where said operator stands of the apparatus body in said information equipment apparatus.

[17] An information equipment apparatus according to any on of [11] to [16] above wherein the antenna is placed at a position where the operator stands in the neighborhood of the apparatus body of the information equipment apparatus.

BRIEF DESCRIPTION OF THE DRAWINGS

These and other objects, advantages and features of the invention will become apparent from the following description thereof taken in conjunction with the accompanying drawings in which.

DETAILED DESCRIPTION OF THE PREFERRED EMBODIMENTS

In the following, some preferred embodiments of the present invention are explained with reference to the drawings.

Figure 1:
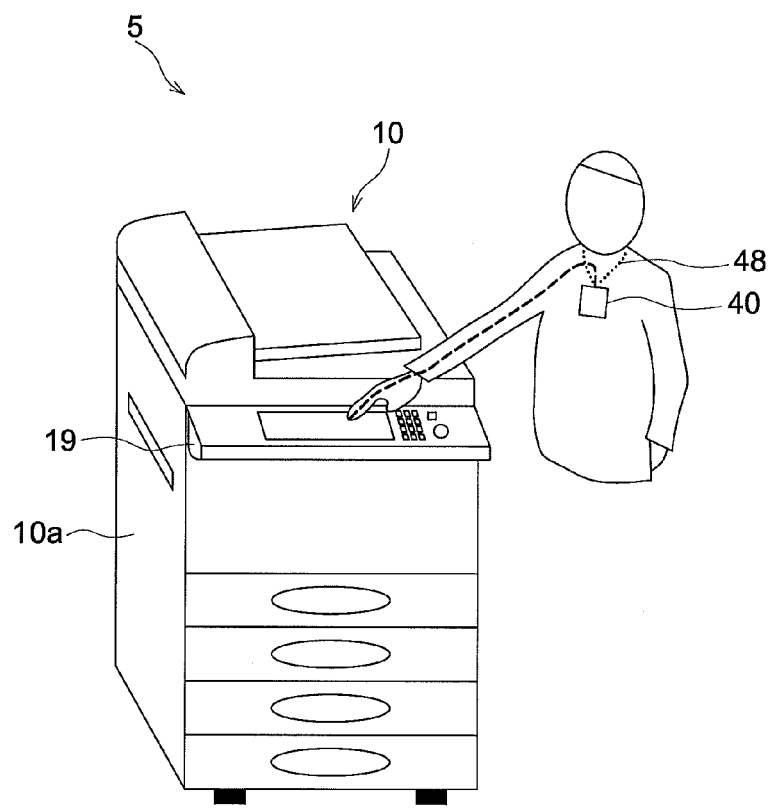
FIG. 1 is a diagram showing the configuration of an image processing system comprising a multifunction peripheral and a terminal apparatus as an information equipment apparatus according one preferred embodiment of the present invention.

FIG. 1 is a diagram showing an example of the system configuration of an image processing system 5 according one preferred embodiment of the present invention. The image processing system 5 comprises an multifunction peripheral 10 as an image processing apparatus (information equipment apparatus) and a terminal apparatus 40 storing the authentication data (identification data) of the user using the multifunction peripheral 10. The multifunction peripheral 10 is provided with an operation panel 19 at the front top part of an apparatus body 10a. The user can carry out various operations for using this multifunction peripheral 10 via this operation panel 19.

The multifunction peripheral 10 has the copying function of reading out original document images optically and printing and outputting its copy images on a recording sheet, the scanning function of storing in files the image data of reading out the original document or of transmitting to an information processing terminal such as a personal computer, the printer function of printing and outputting on a recording sheet the images corresponding to the print data received from an information processing terminal, and the facsimile function of transmitting and receiving image data, etc.

In addition, the multifunction peripheral 10 has the function of carrying out communication with a terminal apparatus 40 carried by a user using the human body of the user as the communication path (human body communication), the function of, in coordination with the detection of an operation of the operation panel 19 by the user, communicating with the terminal apparatus 40 using the human body of the user as the communication path and authenticating the user based on authentication data (user authentication function), and the function of controlling the control operations corresponding to the operation according to the result of that authentication.

While the authentication data is the data for authentication used for user authentication, in the present preferred embodiment it is also provided with the function of an identification data (individual person identification information) with which it is also possible to identify the user. Because of this, the function of controlling the control operations corresponding to the operations according to the above result of authentication, can also be said to be the function of communicating with the terminal apparatus 40 and identifying the user based on the identification data, and according to the result of that identification, controlling the control operations corresponding to the operation.

Human body communication is a communication technology of carrying out short range data communication using the human body as the communication path, and there are several types of methods such as the current method, electric field method, etc.

The current method is the method of causing a very small current (AC) to flow through the human body and to carry out communication by superimposing data (information) on that current. For example, by merely touching the electrode of an information equipment apparatus that is the counterpart of communication with the hand wearing a terminal apparatus (data transmitter and receiver) of the wrist watch type, etc., it becomes possible to carry out data communication between the two apparatuses.

The electric field method is the method of causing dielectric polarization of the human body which is a dielectric body by generating an electric field in the proximity of the human body, the entire human body becomes covered with electric field and become a communication path, and data communication is made using the communication path of electric field induced in the vicinity of the human body (surface of the human body), and is the method of using electric filed as the medium for data signals. In concrete terms, a weak electric field is generated (induced) by applying a voltage (AC voltage) to the surface of the human body by an electrode of the terminal apparatus, this electric field spreads to all over the surface of the human body, and electric field is induced by the human body either coming close to or touching the electrode of the information equipment apparatus thereby generating an electric potential in the electrode. The variations in the electric potential induced in the electrode by these variations in this electric field (electric field strength variations) are detected by an optical type electric field sensor and converted into an electric field thereby carrying out data communication.

In the electric field method, since variations in the electric field are detected as the signal, it is not necessary that the communication equipment such as the terminal apparatus or the information equipment apparatus directly be in contact with the human body, and communication is established even if there is an insulating material in between the signal path. For example, communication is possible not only at the part where the hand (finger) or leg is touching, but also within a range of a few centimeters from the surface of the human body, and communication is possible even if clothes or shoes are present between the human body.

The terminal equipment can be configured in various shapes that the user can carry such as the card type, wrist watch type, key type, etc. For example, in the case in which the configuration is that of the card type of incorporating in an employee identification card, etc., as is shown in FIG. 1, the user can wear that card type terminal equipment 40 round one's neck by attaching a neck strap 48, or can carry it by putting it in a pocket in the clothes. When the configuration is that of the wrist watch type, it is possible to wear it on one's wrist and carry it.

Further, since in human body communication it is possible to supply power to the terminal apparatus via the human body, it is not necessary to install a secondary cell such as a battery etc. in the terminal apparatus, and it is possible to configure a terminal apparatus whose size reduction is easy and which has excellent portability.

Figure 2:
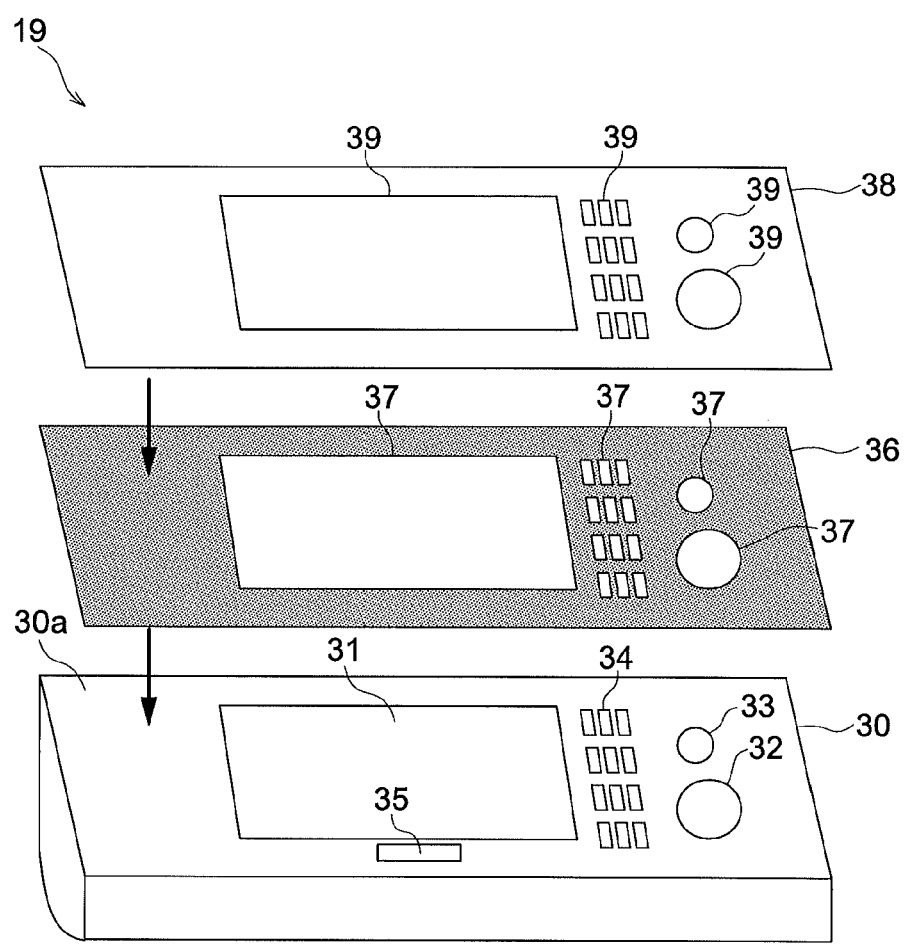
FIG. 2 is a perspective view diagram showing the dismantled state of an operation panel in the multifunction peripheral of FIG. 1.

FIG. 2 is an exploded perspective view diagram of an operation panel 19 in the multifunction peripheral 10. Here, an example is explained of the configuration of adopting the electric field type human body communication.

The operation panel 19 is provided with a panel body 30, an electrode sheet 36, and an insulating cover 38. The electrode sheet 36 and the insulating cover 38 are attached in that order by bonding using an adhesive so as to cover a top surface (external surface) 30a of the panel body 30, thereby configuring the top surface part of the operation panel 19.

The panel body 30 has, on the wide rectangular shaped top surface 30a, a touch panel 31 and a plurality of operation buttons 32 to 34 which are the operation members, and an optical type electric field sensor 35. The touch panel 31 is provided on the top surface (on the screen) of the display section configured using a liquid crystal display, etc., and is a position input device that detects the coordinates of the position that is pressed. This touch panel 31, has a smaller wide rectangular shape than the top surface 30a of the panel body 30, and is positioned roughly at the center of the top surface 30a of the panel body 30. The plurality of operation buttons are the mode selection button, start button 32, stop button 33, ten keys 34, etc., and are placed, for example, on the right side region in the top surface 30a of the panel body 30 (on the right side of the touch panel 31), etc.

The electrode sheet 36 carries out the function of an antenna for carrying out human body communication of the electric field type. This electrode sheet 36 is formed using an electrically conductive material, and has a wide rectangular shape with either the same or almost the same size as the top surface 30a of the panel body 30. Openings 37 are formed at the various locations in the electrode sheet 36 corresponding to the touch panel 31 and the different operation buttons 32 to 34, so as to expose these operation members above the operation panel. On the top surface (external surface) of the electrode sheet 36, for example, is marked by printing, etc., an operation guide such as the names or functions of operation buttons, explanations of the touch panel 31 operations, etc. This electrode sheet 36 also has the function of displaying the operation guide, and configuration is one in which it is used also as an operation guide sheet.

When the electrode sheet 36 is attached to the top surface 30a of the panel body 30, the top surface 30a is covered by the electrode sheet 36 and the operation members are exposed through the openings 37. Because of this, the configuration is one in which the electrode sheet 36 is placed on the periphery of the operation members. Further, the electrode sheet 36 of this example, although has been placed so as to surround the operation members, it is also possible to place it on the periphery of the operation members without surrounding them. For example, regarding the touch panel 31, it is possible to have a configuration in which the electrode sheet is placed in the peripheral areas at the left, right, and bottom sides excepting the top side.

The insulating cover 38 is formed using an insulating material such as a plastic, etc. The insulating cover 38, similar to the electrode sheet 36, has a wide rectangular shape with either the same or almost the same size as the top surface 30a of the panel body 30, and has openings 39 formed at the various locations corresponding to the touch panel 31 and the different operation buttons 32 to 34. Further, at least at the locations corresponding to the operation guide of the electrode sheet 36, it is formed to have optical transparency. For example, the entire cover is formed using a synthetic plastic material having optical transparency. Or else, even when that material is to be colored by painting for decoration, etc., it is possible to configure so that it is formed so as not to color the above locations and to leave them optically transparent.

When the insulating cover 38 is superimposed with the electrode sheet 36 and placed over the panel body 30, the electrode sheet 36 is covered by the insulating cover 38 and the operation members are exposed through the openings 39. Because of this, the configuration becomes one in which the visibility and operability of the operation members are ensured.

The optical type electric field sensor 35 is one that carries out the function of a communication section (receiver section) for carrying out human body communication of the electric field type and is installed, for example, a little towards the front of the approximately central position in the top surface 30*a* of the panel body 30 (on the front side of the touch panel 31), etc. This optical type electric field sensor 35 can be placed in any position in the panel body 30 as long as the position is one where it is possible to connect it to the electrode sheet 36, in detailed terms, a position where it is possible to detect the electric potential generated in the electrode sheet 36 due to being induced by the electric field.

The optical type electric field sensor 35 is configured, for example, to have electro optical crystals, a laser light source, a polarization plate, a photo detector, etc. The electro optical crystals are optical elements having the electro optical effect of changing the optical characteristics (refractive index) due to changes in the electric potential. A part of the electro optical crystals, for example, are connected to the electrode sheet 36, and any part other than that connected part is connected to the GND (ground) of the multifunction peripheral 10 and hence the electric potential generated in the electrode sheet 36 due to being induced by an electric field is applied to the electro optical crystals.

The connection with the electrode sheet 36, for example, can have a configuration in which the top surface part of the optical type electric field sensor 35 made to be exposed from the top surface 30*a* of the panel body 30 and to contact directly with the electrode sheet 36, or else, can have a configuration in which a part (the connection part) of it is placed at a distance at which it is possible to detect the electric potential generated in the electrode sheet 36 (proximity placement). However, in order to detect weak electric potentials with good accuracy, a configuration in which the optical type electric field sensor 35 is connected by being in contact with the electrode sheet 36 is desirable.

In this optical type electric field sensor 35, by irradiating the electro optical crystals with a laser beam from a laser light source, converting the laser light beam that has passed through the electro optical crystals into a prescribed polarized light using a polarization plate, and detecting the intensity of that light and converting it into an electrical signal, electrical signals are extracted from the changes in the electrical potential that are generated in the electrode sheet 36 by being induced by the electric field and applied to the electro optical crystals.

In the human body communication of the electric field type, as has been explained above, since communication is possible even if an insulating member is present in the communication path, and since communication is possible even with a range of a few centimeters from the surface of the human body, communication can be made even if the hand or the fingers do not directly touch the electrode sheet 36 but are in close proximity with it at the time of operating (pressing) the touch panel 31 or the operation buttons 32 to 34.

Further, although in this example the electrode sheet 36 was placed around (in the periphery of) the operation members, it is also possible to place it so that it covers the operation members. For example, using an elastic material having electrical conductivity and optical transparency such as a conductive plastic, etc., it is also possible to form an electrode sheet with which is it possible to ensure the visibility and operability of the covered operation members.

If it is an electrode sheet of this type, it is also possible to use this for the current method in which communication is possible by directly touching the electrode (antenna). Further, in the case of the current method, for the terminal apparatus 40, the wrist watch type, etc., that are carried (worn) in direct contact with the human body are ideally suitable.

Figure 3:
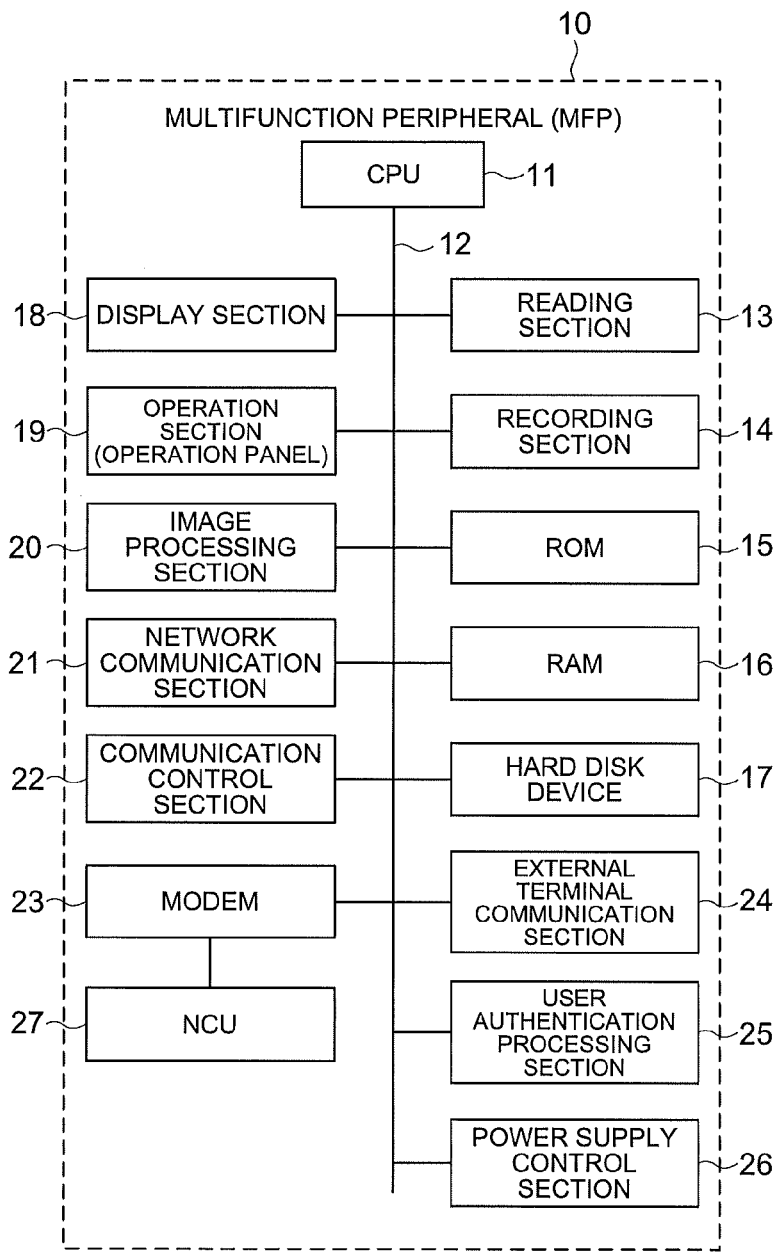
FIG. 3 is a block diagram showing the configuration of the control system of the multifunction peripheral according a preferred embodiment of the present invention.

FIG. 3 is a block diagram showing the outline configuration of a multifunction peripheral 10. The multifunction peripheral 10 is configured by connecting to a CPU (Central Processing Unit) 11 that controls the control operations of that multifunction peripheral 11, via a bus 12, a reading section 13, a recording section 14, a ROM (Read Only Memory) 15, a RAM (Random Access Memory) 16, a hard disk device 17, a display section 18, an operation section 19, an image processing section 20, a network communication section 21, a communication control section 22, a modem 23, an external terminal communication section 24, a user authentication processing section 25, a power supply control section 26, etc. An NCU (Network Control Unit) 27 is connected hierarchically under the modem 23.

The reading section 13 reads the images of the original document optically and obtains the image data. The reading section 13 is configured, for example, to be provided with a light source that emits light on to the original document, a line image sensor that reads one line along the width direction of the original document by receiving the reflected light, an optical system having lenses and mirrors that guide the light reflected from the original document to the line image sensor, and in addition, a movement mechanism that successively moves the reading position along the length direction of the original document in units of a line by moving the mirror, the light source, etc.

The recording section 14 is one that forms and outputs images based on the image data on a recording sheet using an electro photographic process. The recording section 14 is configured as a so called laser printer having, for example, a recording sheet conveying apparatus, a photoreceptor drum, a charging unit, an LD (Laser Diode) whose turning ON and OFF is controlled according to the image data that is input, a scanning unit that causes the light beam emitted from the LD to be scanned on the photoreceptor drum, a developing unit, a transfer and separation unit, a cleaning unit, and a fixing unit In stead of the laser light, this can also be an LED printer that illuminates the photoreceptor drum using LEDs (Light Emitting Diodes) or can be a printer of other types.

The ROM 15 stores various types of programs and fixed data, and the CPU 11 executes various processings according to these programs. The RAM 16 is used as a work memory which the CPU 11 uses for temporarily storing various types of data when it is executing programs and as an image memory for temporarily storing image data. The hard disk device 17 is used for storing the image data of the original document read out by the reading section 13, the print data received from an information processing terminal (personal computer), etc., or the image data, etc., received by facsimile reception.

The display section 18 is constructed from a liquid crystal display, etc., and displays various types of screens such as operation screens, settings screen, editing screen, etc. The operation section 19 is configured as an operation panel (19) having various types of buttons such as the mode selection button, start button 32, stop button 33, ten keys 34 described regarding FIG. 2, and a touch panel 31 that is provided on the surface of the liquid crystal display and that detects the coordinates position of the pressed position, etc.

The image processing section 20 has the function of carrying out rasterizing of the print data (print data in the vector format) received from the information processing terminal, and carries out various image processing on the image data, such as image correction, rotation, enlargement/reduction, compression/decompression, etc.

The network communication section 21 transmits and receives various types of data to and from the information processing terminal, etc., via a network such as a LAN (Local Area Network). The communication control section 22 carries out the protocol control, etc., related to facsimile communication. The modem 23 carries out modulation and demodulation so that the digital signals can be transmitted as analog signals, and the NCU 27 is connected to a public switched telephone network and carries out the controls and detections related to call generation and call reception.

The external terminal communication section 24 has the function of carrying out data communication with terminal apparatuses 40 using human body as the communication path. When using human body communication of the electrical field method, the external terminal communication section 24 is configured to be provided with an optical type electric field sensor 35 explained regarding FIG. 2, and has its functions.

The user authentication processing section 25 carries out user recognition (identification) and authentication (authentication processing) by carrying out control operations such as comparing the authentication data received from a terminal apparatus 40 by the external terminal communication section 24 with the authentication data for comparison that is stored in the multifunction peripheral 10. Further, it is not necessary to limit to the configuration of carrying out authentication processing by receiving the authentication data in this manner, and it is also possible to have a configuration, for example, in which the user authentication processing section 25 accesses a terminal apparatus 40 via the external terminal communication section 24, and carries out the authentication processing based on the authentication data in the terminal apparatus 40.

The power supply control section 26 controls the power supply to the different sections of the multifunction peripheral 10, and carries out the control of switching between the normal mode in which the power supply is given to all the sections of the multifunction peripheral 10, and the standby mode (power saving mode) of stopping the power supply to all sections other than the sections detecting the start of user operation or the arrival of a call.

The multifunction peripheral 10, when power supply is switched ON, goes into the state in which the communication with a terminal apparatus 40 can be carried out at any time. However, in order to suppress the power consumption, normally (when there is no operation) the mode is the standby mode.

Figure 4:
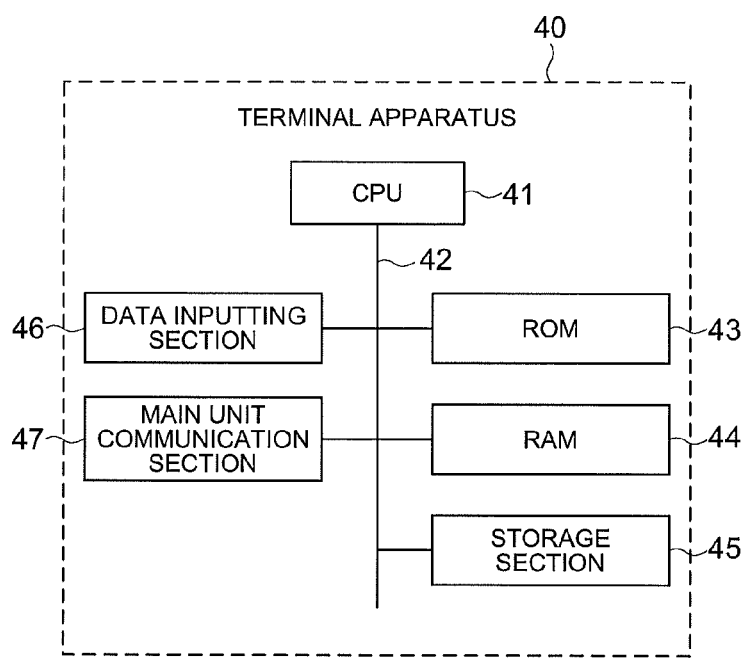
FIG. 4 is a block diagram showing the configuration of the control system of the terminal apparatus according a preferred embodiment of the present invention.

FIG. 4 is a block diagram showing the outline configuration of a terminal apparatus 40. A terminal apparatus 40 is configured by connecting to a CPU 41 that comprehensively controls the operations of that terminal apparatus 40 via a bus 42 a ROM 43, a RAM 44, a storage section 45, a data input section 46, and a main unit communication section 47, etc.

The ROM 43 stores various types of programs that are executed by the CPU 41 and various types of fixed data. The RAM 44 is used as a work memory which the CPU 41 uses for temporarily storing various types of data when it is executing programs and as a communication buffer for temporarily storing data related to transmission and reception.

The storage section 45 is a nonvolatile memory, and stores the authentication data used for user authentication. The data input section 46 is an interface section for externally inputting the data stored in the storage section 45. The main unit communication section 47 has the function of carrying out data communication with the multifunction peripheral 10 using human body as the communication path.

Next, the control operations of the multifunction peripheral 10 are explained.

Figure 5:
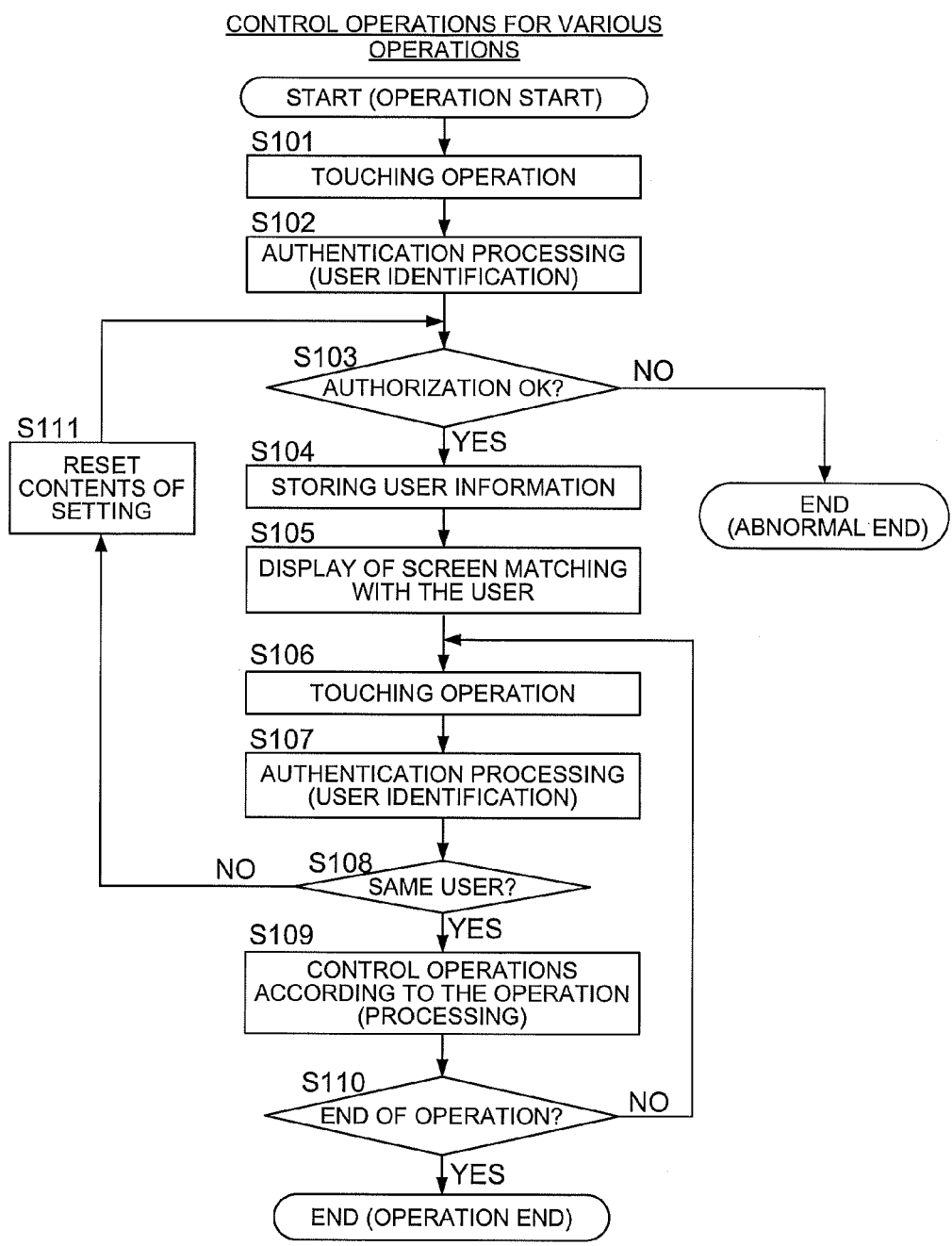
FIG. 5 is a flow chart showing the control operations for the different operations by a multifunction peripheral according a preferred embodiment of the present invention.

Examples of Control Operations for Different Operations:

FIG. 5 shows the control operations for the operations when different types of operations are made in the multifunction peripheral 10. The different operations are, for example, transition of screens, job setting and execution, operations such as preview display or editing of the document files or image files (image data) stored in the hard disk device 17. Here, although the multifunction peripheral 10 operates so that, every time it receives an operation from a user, user authentication is carried out based on the authentication data received by carrying out data communication with the terminal apparatus 40 carried by the user using human body communication, here the explanations are given for the case in which human body communication of the electric field type is used.

Further, the multifunction peripheral 10 manages the control operations (transition of screens, job setting and execution, file preview display or editing) related to the operation received from an authenticated user while establishing correspondence between the operations and the user, and carries out user authentication for a newly received operation during that management, and according to the result of this authentication, carries out control of the control operations related to the newly received operation. In detailed terms, the control operations related to a newly received operation are changed according to whether or not the user carrying out that operation matches with the user related to the operation under management.

Further, here, although the case is explained in which the multifunction peripheral 10 is in the normal mode before starting an operation, basically the control operations are made in a similar manner even in the case in which the multifunction peripheral is in the standby mode.

A user carrying a terminal apparatus 40, for using the multifunction peripheral 10, operates a desired operation member of the operation panel 19. For example, the user carries out a touching operation (starting operation) of either touching the touch panel 31 or pressing the mode selection button.

In the multifunction peripheral 10, along with receiving the touch operation of an operation member of the operation panel 19 by the user (Step S101), by the electrode sheet 36 that is connected to the external terminal communication section 24 (optical type electric field sensor 35) and that is also placed in the periphery of the operation member, a communication path that includes the human body of the user is established between the external terminal communication section 24 and the terminal apparatus 40 carried by the user. Through this communication path, data communication is carried out between the external terminal communication section 24 and the terminal apparatus 40. In detailed terms, when a finger or a hand comes within close proximity of the electrode sheet 36 at the time that the user makes an operation of touching an operation member, the authentication data inside the terminal apparatus 40 is received by the electrode sheet 36 from the part of the human body of the user close to it, and is input to the external terminal communication section 24.

The user authentication processing section 25 of the multifunction peripheral 10, when an operation member in the operation panel 19 receives a touching operation, recognizes (identification) and authenticates the user by the authentication process such as comparing the authentication data input to the external terminal communications section 24 with the authentication data for comparison that is stored inside the multifunction peripheral 10 (Step S102). When authentication is not possible (NO in Step S103), the CPU 11 does not permit this user to use the multifunction peripheral 10, and this operation ends as an error (END).

When user authentication is possible (YES in Step S103) the CPU 11 permits this user to use the multifunction peripheral 10. Next, the information of this user is stored in the RAM 16 (Step S104), a screen matching with this user in the display section 18 is displayed (Step S105), and the multifunction peripheral 10 is put in the state of waiting for the next operation.

The user information stored is, for example, a management table, etc., for managing (recognition) the authenticated user and the control operations related to the operations by the user. For example, when a user is authenticated, a management table is prepared in the RAM 16, and the identification information of the user (user ID, etc.), information indicating the contents of operation (screen transition information, job type information, job settings information, etc.), information indicating the status of the job (setting in progress, editing in progress, execution in progress, etc.), and other information are stored in the management table after establishing correspondence. This management table is stored at least until the job is cancelled or until the execution is made and completed upon receiving an operation from the user instructing execution, and after that, it is erased automatically.

Due to this management table, management of an authenticated user and the control operations related to the operations by that user, for example, display of screens, job type selection, setting, canceling, execution (start and end), pending, interrupting, refusal to accept operations, etc., corresponding to the operation button whose touch operation was detected are managed.

The displayed screen is switched according to the operation received from the user. For example, this screen can be the screen for the mode corresponding to the pressed mode selection button (hard button), or the screen corresponding to the operation button that was touched among the different operation buttons (soft buttons) being displayed in the display section, etc.

Next, when a touch operation is received of an operation member in the operation panel 19 (Step S106), based on the authentication data input to the external terminal communication section 24 along with that touch operation, user identification and authentication is carried out by authentication processing similar to that in Step S102 (Step S107). The CPU 11 compares the user identified here, that is, the user who has made the new operation, with the user indicated by the information (user identification information, etc.) stored in Step S104, that is, the user who carried out the immediately previous operation, and when it is the same user (YES in Step S108), carries out the control operations (processing) corresponding to that operation (Step S109). When the operation does not end due to this operation (NO in Step S110), the operation returns to Step S106, and the peripheral goes into the state of waiting for the next operation.

Further, if the user making the new operation is not the same as the user who made the immediately previous operation (NO in Step S108), the contents of setting are reset such as by erasing the management table of the previous user (Step S111), and the operation returns to Step S103. When the user who made the new operation cannot be authenticated (NO in Step S103), the CPU 11 does not permit this user to use the multifunction peripheral 10, and this operation ends as an error (END). When user authentication is possible (YES in Step S103), the CPU 11 permits this user to use the multifunction peripheral 10, and carries out control operations similar to Step S104 and beyond. In this case, a management table is created of the newly authenticated user who is different from the authenticated user who was making the immediately previous operation, and the control operations related to the operations of that user will be managed.

Further, when the control operations ended in Step S110 (YES in Step S110), this processing is ended (END).

Further, if the authentication data is not input during the touch operation of an operation member in Step S106, it is possible to judge that some object has contacted the operation member, and to make no control operations (processings) for that operation, and go into the state of waiting for the next operation.

In this manner, in a multifunction peripheral 10 according to the present preferred embodiment, when authenticating (identifying), by carrying out data communication using human body communication, a user using a multifunction peripheral 10 by operating an operation panel 19 provided with a plurality of operation members, as an interface with the user for carrying out that authentication, with a simple configuration of merely placing an electrode sheet 36 on the surface of the operation panel 19, it is possible to authenticate a user by carrying out data communication using human body communication with the terminal apparatus 40 of the user who operates an operation member of the operation panel 19.

In particular, when carrying out human body communication of the electric field method, with a simple configuration of merely combining an electric field sensor (optical type electric field sensor 35) with the electrode sheet 36, it is possible to take out as an electrical signal the data for authenticating the user (authenticating data) from the electric potential change that is generated in the electrode sheet 36 which is induced by the electric field on the surface of the human body that has come to close proximity of the electrode sheet 36, and it is possible to authenticate the user.

In detailed terms, when a finger or a hand of the user comes close to the electrode sheet 36 on the operation panel 19 at the time of operating an operation member, because of the electrode sheet 36 a communication path including the human body of the user is formed between the external terminal communication section 24 (optical type electric field sensor 35) and the terminal apparatus 40, and it is possible, via this communication path, to receive the authentication data of that user from the terminal apparatus 40 of the user, and to authenticate the user. Further, because of this type of simple configuration, it becomes possible to recognize while distinguishing between an operation by an authenticated user and other operations, for example, an operation by another user or an erroneous operation caused by some object touching an operation member, and it is possible to prevent erroneous recognition of operations. In addition, because in the present preferred embodiment the electrode sheet 36 is being used also as an operation guide sheet, it is possible to configure at a lower cost compared to the case of providing these two individually, and even the assembly of the operation panel 19 becomes simple.

Further, in the multifunction peripheral 10, even if the user does not carry out separately an authentication operation of password authentication, card authentication, or biometric information authentication such as fingerprint or veins, user authentication (authentication processing) is made in coordination with the detection of an operation of the operation panel 19 (touching operation), and user identification and authentication are carried out. Further, the multifunction peripheral 10, according to the result of this authentication (identification result), controls the control operations corresponding to that operation.

For example, as has been explained regarding FIG. 5, when authentication is not possible, it is possible to carry out controls such as not making the control operations according to the operation (not accepting the operation), making the control operations according to the operation when the authentication is permitted (the operation is accepted), and depending on whether or not the user is the same between the previous operation and the new operation, that is, whether the same user is continuing the operation or not, or whether or not there is a change in the user, accepting or otherwise of operation or carrying out control operations corresponding to the new user. Further, even without first ending the control operations being managed, it is possible to identify (authenticate) a user making a new operation, and it is also possible to carry out controls of the control operations for that operation.

Because of this, without carrying out special operations, and without changing the user authentication state (recognition state) between users, it is possible to carry out control operations corresponding to the user of the received operation. In user authentication, not only the special operations such as in conventional authentication (authentication operation or authentication releasing operation) are not necessary, but also it is possible not to accept operations from other than authenticated users, or to switch the operations for each authenticated user (authentication state in coordination with the detection of operation, and automatic switching of operations), etc. Because of this, while enhancing the operability and security of user authentication, the convenience is enhanced because it is possible to carry out control operations corresponding to the user of the received operation.

In particular, when the user changes during the management of control operations related to setting of a job as explained regarding FIG. 5, the settings of the job being managed related to the user before changing are made invalid and the control operations are switched to the control operations of the new user, and the management of the new control operations is started. In this kind of switching of users, while maintaining the security of the control operations being managed before switching, the operability is enhanced for the new user.

Figure 6:
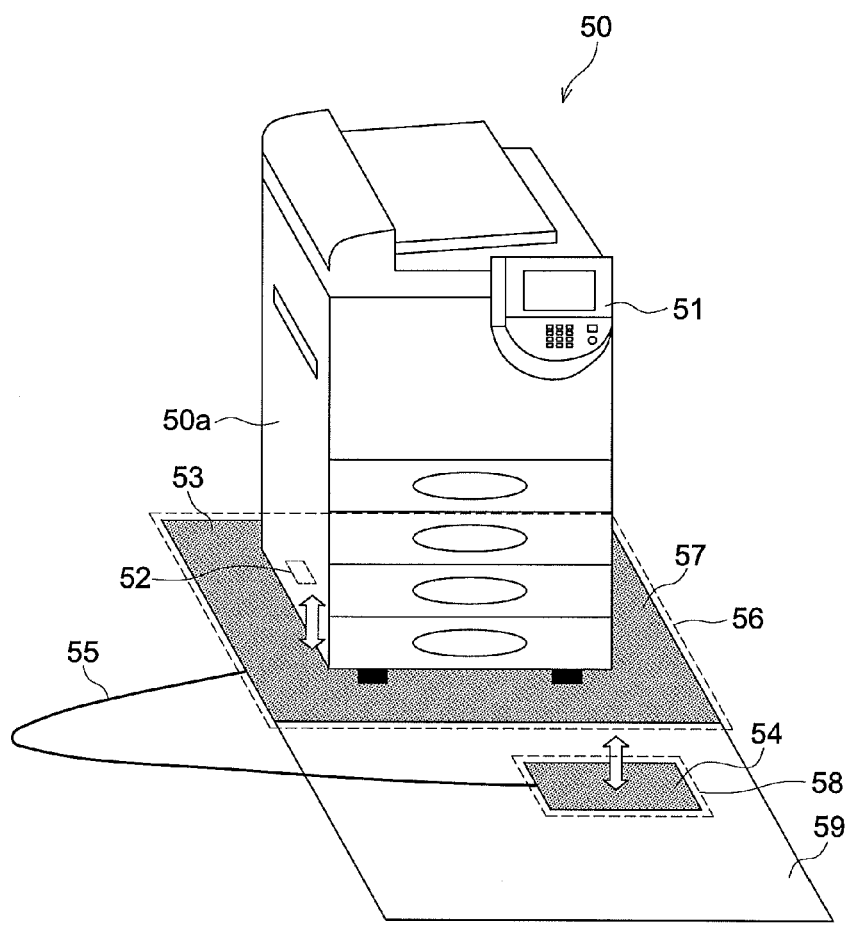
FIG. 6 is a diagram showing an example of the configuration placing an electrode sheet in the neighborhood of the multifunction peripheral for communicating with the terminal apparatus.

Example of Electrode Placement:

FIG. 6 is an example of the configuration in the case in which an electrode sheet having the function of an antenna in human body communication is placed in the periphery of a multifunction peripheral.

In the multifunction peripheral 50 in this example, an operation panel 51 is provided on the right side in the front top part of the apparatus body 50a. Similar to the operation panel 19 explained regarding FIG. 2, even this operation panel 51 is provided with a plurality of operation members such as a touch panel and various operation buttons. However, in the operation panel 51, the electrode sheet and the optical type electric field sensor explained regarding FIG. 2 have not been provided, and the optical type electric field sensor 52 is provided on the bottom part of the apparatus body 50a. In addition, in the multifunction peripheral 50, two electrode sheets 53 and 54, and electrically conductive cables 55 connected to these have been provided.

One electrode sheet 53 has been buried under the carpet or under the floor material (floor panel) in the installation area 56 where the multifunction peripheral 50 is installed. In this example, the electrode sheet 53 has been placed in the left side area of the installation area 56 which is rectangular shaped with a size a little larger than the bottom surface of the multifunction peripheral 50 (apparatus body 50a). The left side area in the installation area 56 is taken as the GND area 57 where the floor material, etc., is connected to ground, and this electrode sheet 53 is insulated from the GND area 57.

In the multifunction peripheral 50, the right side legs are grounded above the floor of the GND area, the left side legs are grounded above the floor where the electrode sheet 53 is buried, which are provided within the installation area 56, and the optical type electric field sensor 52 is placed in close proximity with the electrode sheet 53.

The optical type electric field sensor 52, similar to the multifunction peripheral 10 described above, performs the function as a communication section (receiving section) for carrying out human body communication of the electric field type, and in the present example, has the function of obtaining an electrical signal from the changes in the potential of the electric field that is transmitted from the electrode sheet 53 via the legs to the apparatus body 50a. This optical type electric field sensor 52 can be placed at any desired position in the apparatus body 50a. However, in order to detect with good accuracy the weak electric potential that is transmitted from the electrode sheet 53 via the legs (plastic casters, etc.) to the apparatus body 50a, it is desirable to place it near the legs (in this example, in proximity with the leg on the left side that is in close proximity with the electrode sheet 53).

It is desirable that the electrode sheet 53 is placed at a position corresponding to that leg (position close to the leg). The electrode sheet 53 in this example is taken to have a size and placement that includes the position corresponding to that leg, and is configured so that the transmission loss of electrical field is suppressed and the electric filed is transmitted efficiently to the leg.

The other electrode sheet 54 that is connected to this electrode sheet 53 by an electrically conductive cable 55 has been buried under the recognition area 58 of the multifunction peripheral 50 (under the carpet or under the floor material). Similarly, even the electrically conductive cable 55 is buried under the floor between the electrode sheet 53 and the electrode sheet 54.

The authentication area is the area that includes the position where the user stands at the time of operating the operation panel 51 of the multifunction peripheral 50. For example, an area of a size that includes a position that is to the front of the operation panel 51 of the multifunction peripheral 50 by a prescribed distance (for example, few tens of centimeters) and that has a prescribed area (for example, a size on which both feet are present in the state in which one single person is standing) is considered to be the authentication area. The electrode sheet 54 is placed within this authentication area 58. In this example, the electrode sheet 54 has almost the same size as the authentication area 58. In addition, the periphery of the authentication area 58 in which the electrode sheet 54 has been placed is the GND area 59 in which the floor material, etc., is connected to a grounding, and the electrode sheet 54 has been insulated from this GM) area 59.

When the multifunction peripheral 50 receives an operation of an operation member in the operation panel 51 (touching operation), control operations similar to the control operations shown in FIG. 5 are carried out. In other words, authentication processing (Step S102/S107) is carried out every time an operation is received, and according to the result of authentication (result of user identification), control of the control operations corresponding to the operation is carried out.

Further, with the configuration of this example, identification and authentication of the user is possible by the user simply standing on the authentication area 58. In other words, it is possible to identify and authenticate users related to the operations, including a person trying to operate the operation panel 51 in addition to the user operating the operation panel 51. It is also possible to configure so that the settings are changed according to the necessity, such as, carrying out this user authentication (authentication processing) in coordination with the detection of operations, or carrying it out not in coordination with the detection of operations, for example, after detecting a user in the authentication area 58 (after user authentication) carrying out the authentication processing at all times or at prescribed intervals of time.

Because of this, in the multifunction peripheral 50 of the present example, when a user carrying a terminal equipment 40 stands in front of the operation panel 51 in order to use the multifunction peripheral 50, the floor above the electrode sheet 54 is stepped on by the underside of the foot (the sole of the shoe) positioned within the authentication area 58, and the underside of the foot becomes placed in close proximity to the electrode sheet 54. Next, due to the electrode sheet 24 and the electrode sheet 53 that is connected with the electrode sheet 54 and the electrically conductive cable 55, and that is placed in close proximity with the optical type electrical field sensor 52 of the multifunction peripheral 50, a communication path including the human body of the user is formed between the optical type electric field sensor 52 and the terminal apparatus 40, the multifunction peripheral 50 receives the authentication data of that user from the terminal apparatus 40 of the user via that communication path, and it is possible to carry out user identification and authentication.

In this manner, in the multifunction peripheral 50 of the present example, only with a simple configuration of placing the electrode sheet 54 in a prescribed authentication area 58 in the periphery of the apparatus body 50a, in concrete terms, placing the electrode sheet 54 at the position where the user stands at the time of operating the operation panel 51, it becomes possible to identify and authenticate the user by carrying out data communication using human body communication with the terminal apparatus 40 of the user operating the operation panel 51.

Further, because the configuration is one in which the optical type electric field sensor 52 provided on the apparatus body 50a of the multifunction peripheral 50 is not connected directly with the electrically conductive cable 55, but is connected so that communication is possible via the electrode sheet 53 buried under the floor, etc., it is possible also to bury the electrically conductive cable 55 under the floor. Because of this, when moving the multifunction peripheral 50 (the apparatus body 50a), it is also possible to prevent damage, etc., to the electrically conductive cable 55 due to stepping on or hitching the electrically conductive cable 55 by mistake.

Further, using this configuration it is also possible to prevent theft, etc., of the multifunction peripheral 50. For example, by having a configuration in which a theft prevention system that carries out communication with the optical type electric field sensor 52 either continuously or at prescribed time intervals is connected to the electrode sheet 53, and when it is detected by the theft prevention system that communication is not possible with the optical type electric field sensor 52 because of movement of the multifunction peripheral 50, an alarm is sent to a security company, it is possible to aim at preventing theft of the multifunction peripheral 50.

Further, although in the present example the configuration is one in which the electrode sheet 54 placed at a position at which it comes into close proximity with the human body (sole of the foot) of the user operating the multifunction peripheral 50 is connected with the optical type electric field sensor 52 provided on the apparatus body 50a of the multifunction peripheral 50, through an electrically conductive cable 55 and the electrode sheet 53 placed in the installation area 56 so that communication is possible as has been explained above, it is also possible to have a configuration in which the electrode sheet 54 and the optical type electric field sensor 52 are connected directly by the electrically conductive cable 55. For example, it is also possible to have a configuration in which a connector is provided at the end of the electrically conductive cable 55 so that it can be connected to the optical type electric field sensor 52 in a freely attachable and detachable manner.

Figure 7:
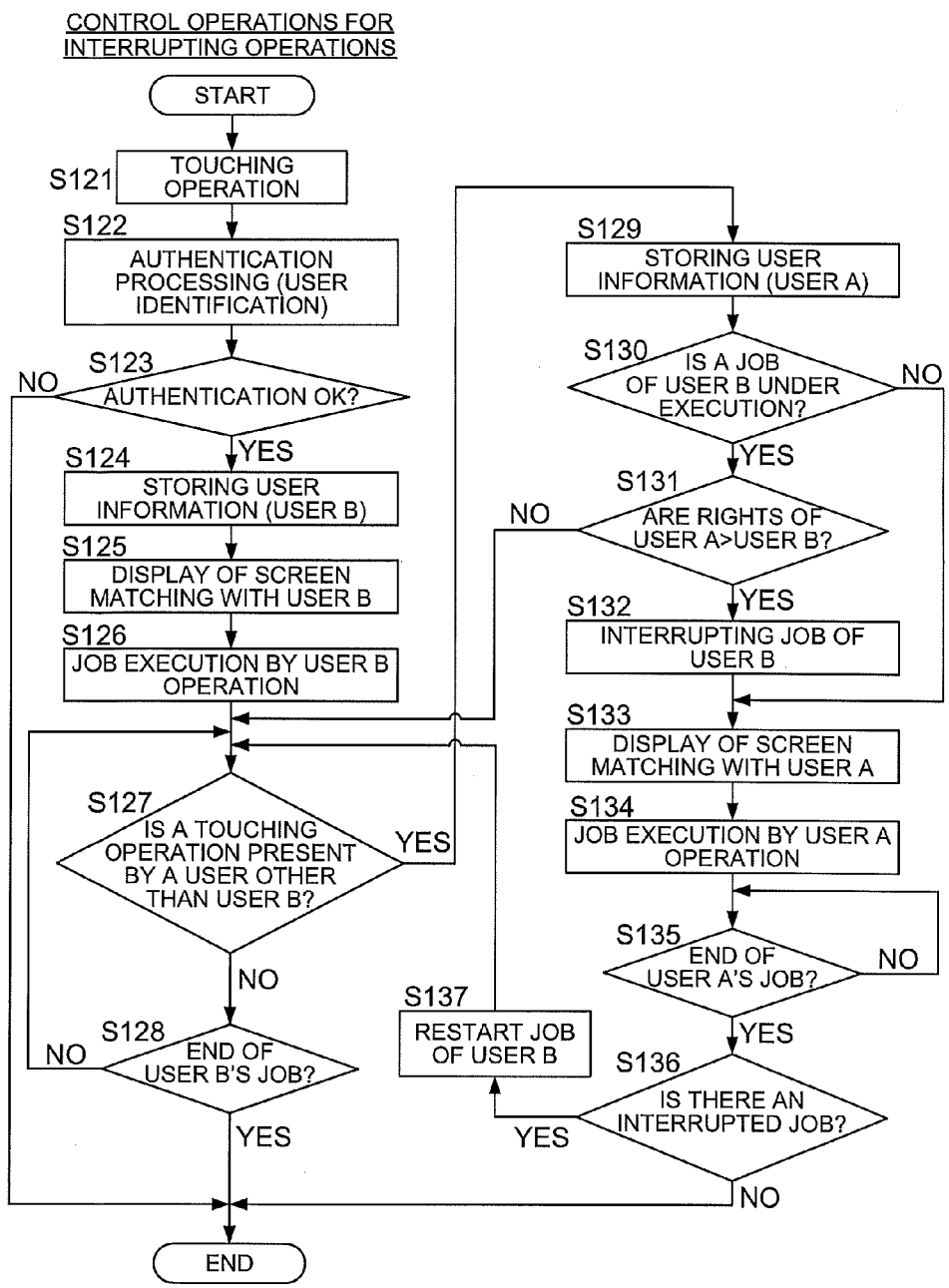
FIG. 7 is a flow chart showing one example of the control operations regarding an interrupting operation in the multifunction peripheral of FIG. 1 and FIG. 6.

Example of Control Operations for an Interrupting Operation:

FIG. 7 shows the control operations for an interrupting operation in the multifunction peripheral 10 or in the multifunction peripheral 50 described above. An interrupting operation is, for example, an operation that, during the execution of a print job of printing out a file stored in the multifunction peripheral or a job of copying an original document, temporarily suspending that job, and executing in an interrupting manner another print job or a copying job. Here, explanations are given for the case when a User A makes an interrupting operation when the job of a User B is being executed.

Further, whether or not to accept an interrupting operation, that is, to which of the previous job and the interrupting job the priority has to be given, is done by comparing the priority levels set in advance for the users, and determining the job to be given priority based on the result of that comparison. Further, when the priority levels are the same, the job that is already under execution is given priority. The priority level is being determined, for example, based on the user attributes such as the designation, affiliation (department, group, etc.), or based on the rights determined for each user. Here, an example is explained in which the rights are used for the priority level.

Further, although similar control operations can be made in both the multifunction peripheral 10 and the multifunction peripheral 50, explanations are given here taking the example of the multifunction peripheral 10.

In the multifunction peripheral 10 (or the multifunction peripheral 50), upon receiving a touching operation by the user of the operation panel 19 (a touching operation of an operation member in the operation panel 19) (Step S121), authentication data is received from the terminal apparatus 40 carried by the user through a communication path that includes the human body of the user, and authentication processing is carried out based on that authentication data (Step S122). When authentication is not possible (NO in Step S123), the multifunction peripheral 10 does not permit the user to use the peripheral and ends this operation (END).

When authentication is permitted (YES in Step S123), for example, if a User B is authenticated at this point, the multifunction peripheral 10 permits its use by the User B. Subsequently, the multifunction peripheral 10 stores the information of User B, for example, the management table for managing the control operations related to the operation made by the User B (Step S124), and displays screens suitable for the User B, for example, the job settings screen, in the display section 18 (Step S125).

When the operations of job setting and execution are received from the User 13 (pressing of the Start button 32), the multifunction peripheral 10 executes that job (Step S126). The multifunction peripheral 10, during the execution of this job, monitors whether to receive a touching operation of the operation panel 19 by a user other than the User B (Step S127), and when without receiving such a touching operation (NO in Step S127), the execution of that job of User B is completed (YES in Step S128), ends this operation (END).

Before ending the job of User B (NO in Step S130), if the above touching operation is received (YES in Step S127), for example, a touching operation by the User A is received, the multifunction peripheral 10 stores the information of User A, for example, the management table for managing the control operations related to the operation by the User A (Step S129), and checks whether or not the job of User B is still under execution (Step S130). For example, if the job of User B ends immediately after receiving the touching operation by User A (NO in Step S130), the operation transits to Step S133.

When the job of User B is under execution (YES in Step S130), the multifunction peripheral 10 compares the rights of User A with the rights of User B (Step S131). If the rights of User A are the same or lower than the rights of User B (NO in Step S131), the operation returns to Step S127 without carrying out processing (controls) according to the touching operation by User A.

If the rights of User A are higher than the rights of User B (YES in Step S131), the multifunction peripheral 10 recognizes it as an interruption control by user A, and switches over from the control of User B to the control of User A. In detailed terms, the job of User B is suspended temporarily (Step S132), and displays screens suitable for the User A, for example, the job settings screen, or an appropriate interruption screen, etc., in the display section 18 (Step S133). When the operations of job setting and execution are received from the User A (interruption execution instruction operation by pressing of the Start button 32), the multifunction peripheral 10 executes that job (Step S134), and monitors the end of that job (NO in Step S135).

When the job of User A ends (YES in Step S135), a check is made as to whether or not there is any suspended job (Step S136). If a suspended job is present (YES in Step S136), for example, if a job of User B has been suspended, the multifunction peripheral 10 resumes that job of User B (Step S137), and returns to Step S127. If there are no suspended jobs (NO in Step S136), this processing is ended (END).

Further, the above interruption control of an earlier job due to an interrupting operation can also be made to be executed at the timing of the interrupting job execution instruction operation (operation of pressing the Start button 32).

In this manner, in the multifunction peripheral 10 or in the multifunction peripheral 50, since it is possible to carry out user authentication using human body communication for each touching operation of the operation panel 19 by the user, and to identify the user based on the authentication data received from the terminal apparatus 40 carried by the user, as in the control operations for interrupting operations as in this example, if the authenticated user (User A) related to the operation received newly does not match with the user (User B) related to the control operations that are currently being managed, that is, when the user related to the control operations currently under management is changed to a newly authenticated user, based on the result of comparing the priority levels of the two users, it is possible to execute the operations of one of the users on a priority basis. For example, a plurality of competing operations, etc., is automatically switched based on the priority levels of the users.

In detailed terms, as has been explained above, it is possible to carry out automatically the interruption control of temporarily suspending a currently executed job of a lower priority user, and executing first the job related to the newly authenticated user, or the standby control of continuing the execution of a job that is currently under execution and that is of a user with a high priority, and keeping waiting a job related to a newly authenticated user with a lower priority.

For example, if during the execution of a copying or printing operation by a certain user (job under execution) another user wants to do copying by interrupting, in general, although it is necessary to make an operation of pressing a specific button such as "Interruption copying", etc., in this example, user authentication is carried out at the timing when an operation of pressing the touch panel or an operation button is made in the operation panel, and it is possible to recognize whether or not it is an operation made by a user different from the user currently carrying out copying or printing. By recognizing that it is an "interrupting operation" merely by making a touching operation of the operation panel, it is possible to transit immediately to an appropriate interruption screen, etc.

In this manner, because of identifying users by carrying out user authentication using human body communication for every operation of the operation panel by a user, and by automatically executing on a priority basis either one of the control operations that are currently being managed and the control operations corresponding to a new operation based on the priority level of the users, the operability and convenience get enhanced.

Figure 8:
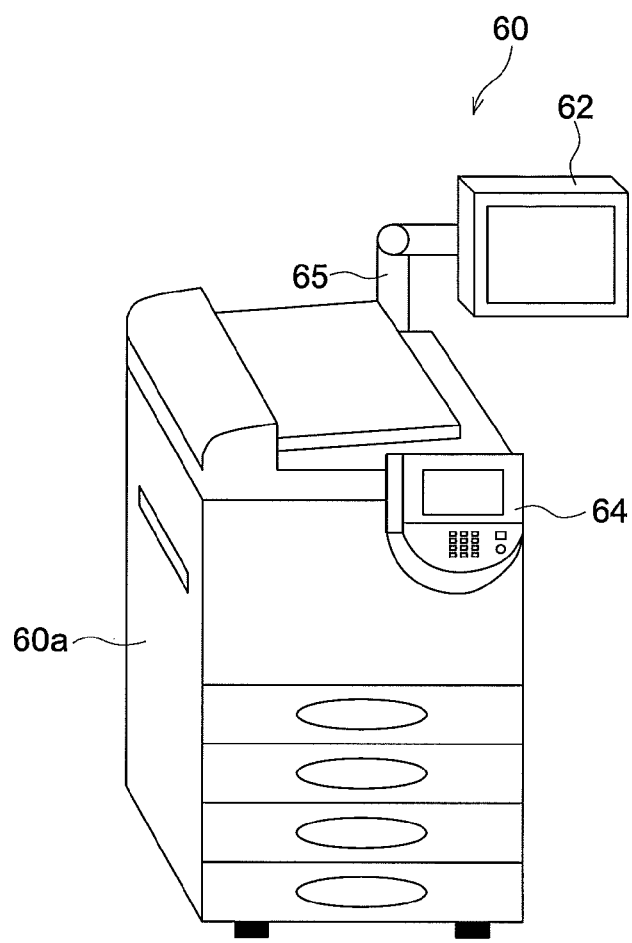
FIG. 8 is a diagram showing one example of the configuration in which a plurality of operation panels are provided for the multifunction peripheral.

Example 1 of Multiple Operation Sections Configuration:

FIG. 8 shows an example of the configuration in which multiple operation panels, with an electrode sheet having the function of an antenna in human body communication provided on the surface, are provided in a multifunction peripheral.

In a multifunction peripheral 10, etc., in which user authentication is carried out using human body communication when an operation is made on the operation panel as described above, since user identification can be made for each operation, for example, regarding various operations that are received at the same instant of time from a plurality of operation panels, to identify the individual users by carrying out different user authentications, and when it is possible to execute in parallel the different control operations (processing) for the different control operations (when they do not conflict with each other), it also becomes possible to execute those different control operations in parallel. In the present example, a configuration is explained in which a multifunction peripheral carries out individual user authentication (individual authentication/parallel authentication) for such simultaneous control operations (parallel operations) using a plurality of operation panels, and carries out simultaneous control (parallel control) of a plurality of operations that can be executed in parallel.

The multifunction peripheral 60 of the present example is provided with two operation panels (operation sections), a large sized first operation panel 62 that is configured as an externally attached operation panel that is placed separated from the apparatus body 60*a*, and a small sized second operation panel 64 that is directly attached to the apparatus body 60*a* and is configured as the body operation panel. Further, the multifunction peripheral 60 is provided with the function of accepting simultaneous operations in these two operation panels, the function of carrying out individual authentications for the simultaneous operations, and the function of carrying out simultaneous control of the different operations when the different operations for the simultaneous operations can be executed in parallel.

The first operation panel 62 has a touch panel which is an operation member provided on the surface of the panel body. This touch panel is provided on the top surface (on the screen) of the display section configured using a large sized liquid crystal display, etc., which is slightly smaller than the surface of the panel body. In addition, on the surface of the panel body is placed a frame shaped electrode sheet (with the shape of a photo frame) on the boundary of the touch panel, and this electrode sheet is covered by an insulating sheet, etc., similar to the case of the operation panel 19 in FIG. 2. Further, also an optical type electric field sensor connected to the electrode sheet is provided on the panel body in a similar manner.

This first operation panel 62 is supported by a supporting arm attached to the apparatus body 60a of the multifunction peripheral 60. For example, as is shown in the figure, a supporting arm 65 has been fixed at the right side of the top part of the back panel of the apparatus body 60a, and the first operation panel 62 is supported by this supporting arm 65 and is placed at the right top part towards the rear side of the apparatus body 60a. In addition, the first operation panel 62, for example, is provided with the functions of making preview display of various files stored in the multifunction peripheral 60, or of editing the file whose preview display is being made, or of accepting various types of operations for saving or printing a file, etc.

The second operation panel 64 has a touch panel and a plurality of operation buttons which are operation members provided on the surface of the panel body. In the second operation panel 64, a touch panel is provided on the surface (on the screen) of a small sized display section configured from a liquid crystal display, etc. The plurality of operation buttons are the mode selection button, the start button, the stop button, ten keys, etc. In addition, on the surface of the panel body, an electrode sheet is provided on the periphery of the operating members, and this electrode sheet is covered by an insulating sheet, etc., similar to the case of the operation panel 19 in FIG. 2. Further, also an optical type electric field sensor connected to the electrode sheet is provided on the panel body in a similar manner.

This second operation panel 64 is placed on the right side of the top part of the front panel of the apparatus body 60a of the multifunction peripheral 60.

Figure 9:
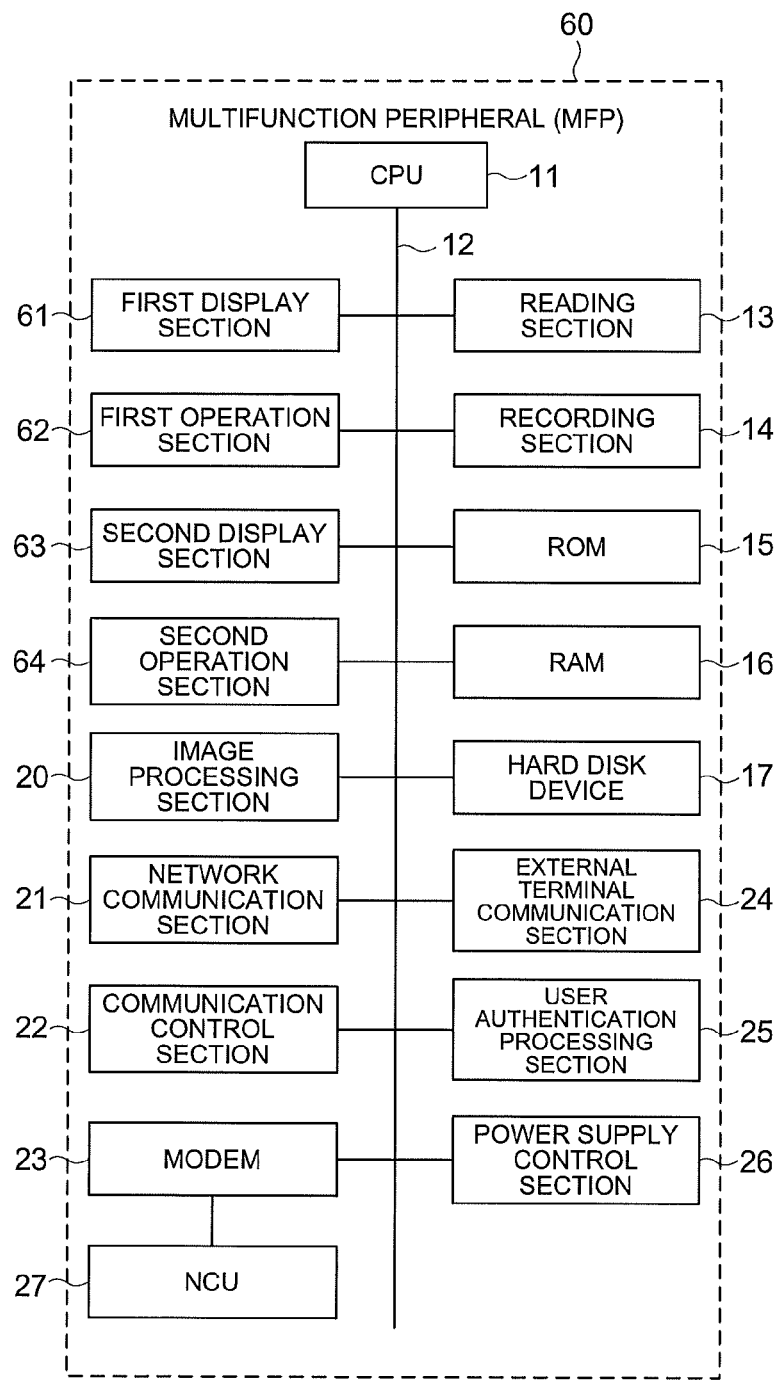
FIG. 9 is a block diagram showing the configuration of the control system of the multifunction peripheral of FIG. 8.

FIG. 9 is a block diagram showing the outline configuration of the multifunction peripheral 60. The multifunction peripheral 60, compared to the configuration of the multifunction peripheral 10 shown in FIG. 3, has a configuration in which the display section 18 replaced by a first display section 61 and a second display section 63, and the operation section 19 (operation panel 19) replaced by a first operation section 62 (first operation panel 62) and a second operation section 64 (second operation panel 64). All other parts have the same configuration as the different parts with the same symbols in the multifunction peripheral 10.

In this manner, in the multifunction peripheral 60 of the present example, since not only two operation panels are provided, but also it is possible to individually and also simultaneously identify and authenticate the users operating the respective operation panels, it is possible to accept operations from two users at the same time and individually, and to carry out simultaneous control of the respective control operations corresponding to the respective operations. For example, it is possible, in the first operation panel 62, to receive from one user the operations for preview display or editing of a document file or image file stored in the multifunction peripheral 60, and to receive from the other user, in the second operation panel 64, an operation for copying or facsimile transmission, etc., and to carry out simultaneous control of the different control operations. In this manner, by making it possible for a plurality of users to carry out simultaneous control operations (parallel operations), the operability and convenience are enhanced.

Figure 10:
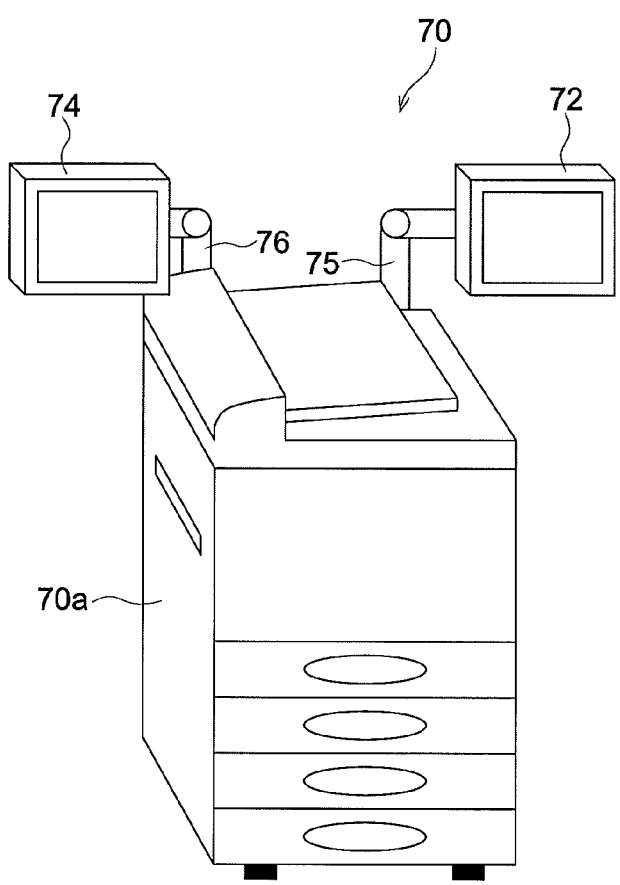
FIG. 10 is a diagram showing one example of the configuration wherein a plurality of operation panels are provided for the multifunction peripheral.

Example 2 of Multiple Operation Sections Configuration:

FIG. 10 shows an example of the configuration when a plurality of large sized operation panels (externally connected operation sections) explained in FIG. 8 are provided in a multifunction peripheral.

The multifunction peripheral 70 of the present example has a configuration in which two operation panels configured as externally attached operation panels and which have the same configuration as the first operation panel 62 described above, and in detailed terms, a first operation panel 72 (the first operation section) and a second operation panel 74 (the second operation section), and no operation panel is provided on the top part of the front surface of the apparatus body 70a. Further, the multifunction peripheral 70, similar to the multifunction peripheral 60 described above, is provided with the function of accepting simultaneous operations in these two operation panels, the function of carrying out individual authentications for the simultaneous operations, and the function of carrying out simultaneous control of the different control operations when the different control operations for the simultaneous operations can be executed in parallel.

The first operation panel 72, as has been explained with reference to FIG. 8, is supported by a supporting arm 75 that has been fixed at the right side of the top part of the back panel of the apparatus body 70a, is supported by this supporting arm 75, and is placed at the right top part towards the rear side of the apparatus body 70a. The second operation panel 74, as has been shown in FIG. 10, is supported by a supporting arm 76 that has been fixed at the left side of the top part of the back panel of the apparatus body 70a, is supported by this supporting arm 76, and is placed at the left top part towards the rear side of the apparatus body 70a.

In this manner, in the multifunction peripheral 70 of the present example, because two operation panels are placed separated to the left and to the right, it becomes possible for two users to make operations with a separating distance between them. Because of this, the operability becomes good at the time that two users simultaneously operate these two operation panels (parallel operation).

Figure 11:
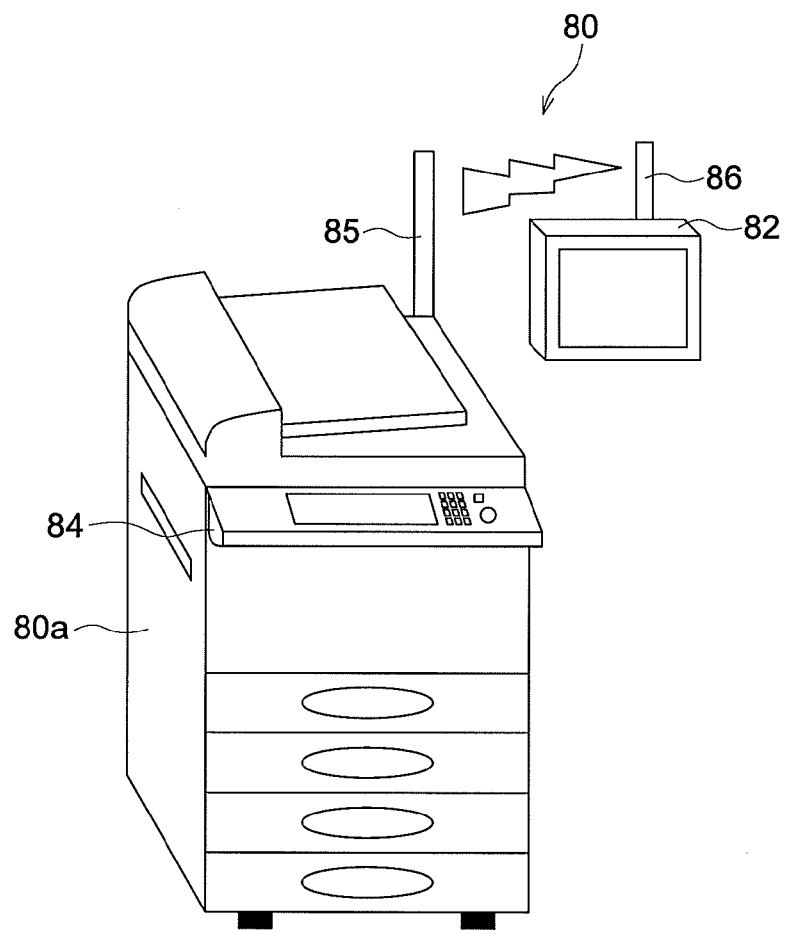
FIG. 11 is a diagram showing one example of the configuration wherein a plurality of operation panels is provided for the multifunction peripheral.

Example 3 of Multiple Operation Sections Configuration:

FIG. 11 shows an example of the configuration when the large sized operation panel explained in FIG. 8 is connected wirelessly to a multifunction peripheral.

The multifunction peripheral 80 of the present example is provided with a large sized first operation panel 82 (first operation section/wireless operation section) that is separated from the apparatus body 80a and that is connected wirelessly to the apparatus body 80a, and a second operation panel 84 (the second operation section/main unit operation section) that is provided at the top part of the front panel of the apparatus body 80a. Further, the multifunction peripheral 80, similar to the multifunction peripherals 60 and 70 described above, is provided with the function of accepting simultaneous operations in these two operation panels, the function of carrying out individual authentications for the simultaneous operations, and the function of carrying out simultaneous control of the different control operations when the different control operations for the simultaneous operations can be executed in parallel.

An operation panel wireless communication section 85 has been provided in the apparatus body 80a, and the first operation panel 82 is provided with a body wireless communication section 86 that carries out wireless communication with this panel wireless communication section 85. Further, in FIG. 11, only the antenna parts of these wireless communication sections have been shown.

The second operation panel 84, for example, has the same configuration as the operation panel 19 explained with reference to FIG. 2. The operation panel on the side of the apparatus body 80a, apart from this, can also be configured to have the second operation panel 64 explained with reference to FIG. 8.

In this manner, in the multifunction peripheral 80 of the present example, because one out of the two operation panels is connected to the apparatus body 80a wirelessly, similar to the multifunction peripheral 70 explained with reference to FIG. 10, it becomes possible for two users to make operations with a separating distance between them, and the operability becomes good at the time that two users operate these two operation panels (parallel operation) simultaneously. In particular in the present example, since the first operation panel 82 can be operated at any place within a range over which communication is possible with the apparatus body 80a, the convenience becomes good.

Further, although explanations were made taking the cases of two operation panels in FIG. 8 to FIG. 11, they can also be made three or more. It is sufficient if the multifunction peripheral is configured so that it is provided with the function of accepting simultaneous operations in these three or more operation panels, the function of carrying out individual authentications for the simultaneous operations, and the function of carrying out simultaneous control of the different control operations when two or more control operations among the different control operations for the simultaneous operations can be executed in parallel. In addition, the operation panel, etc., installed in the apparatus body can also be made an operation panel with a simple construction having no touch panel or display section. Further, it is also possible to configure so that no operation panel is provided on the apparatus body, and all the operation panels are connected with the apparatus body wirelessly.

As a concrete example of simultaneous operation of the above three or more operation panels, one can consider the case in which operations are made in the operation panel of the apparatus body for carrying out scanning operations or printing operations, and at the same time, carrying out in the plurality of operation panels (large sized operation panels) attached externally attached or connected wirelessly operations that do not carry out scanning operations or printing operations, for example, carrying out the operations of preview display or editing of document files stored in the multifunction apparatus. Because of this, in a large scale office, etc., in which the number of users assigned per multifunction peripheral becomes large, it becomes possible to increase the usage rate of the multifunction peripheral, and to increase the productivity (processing efficiency).

Figure 12:
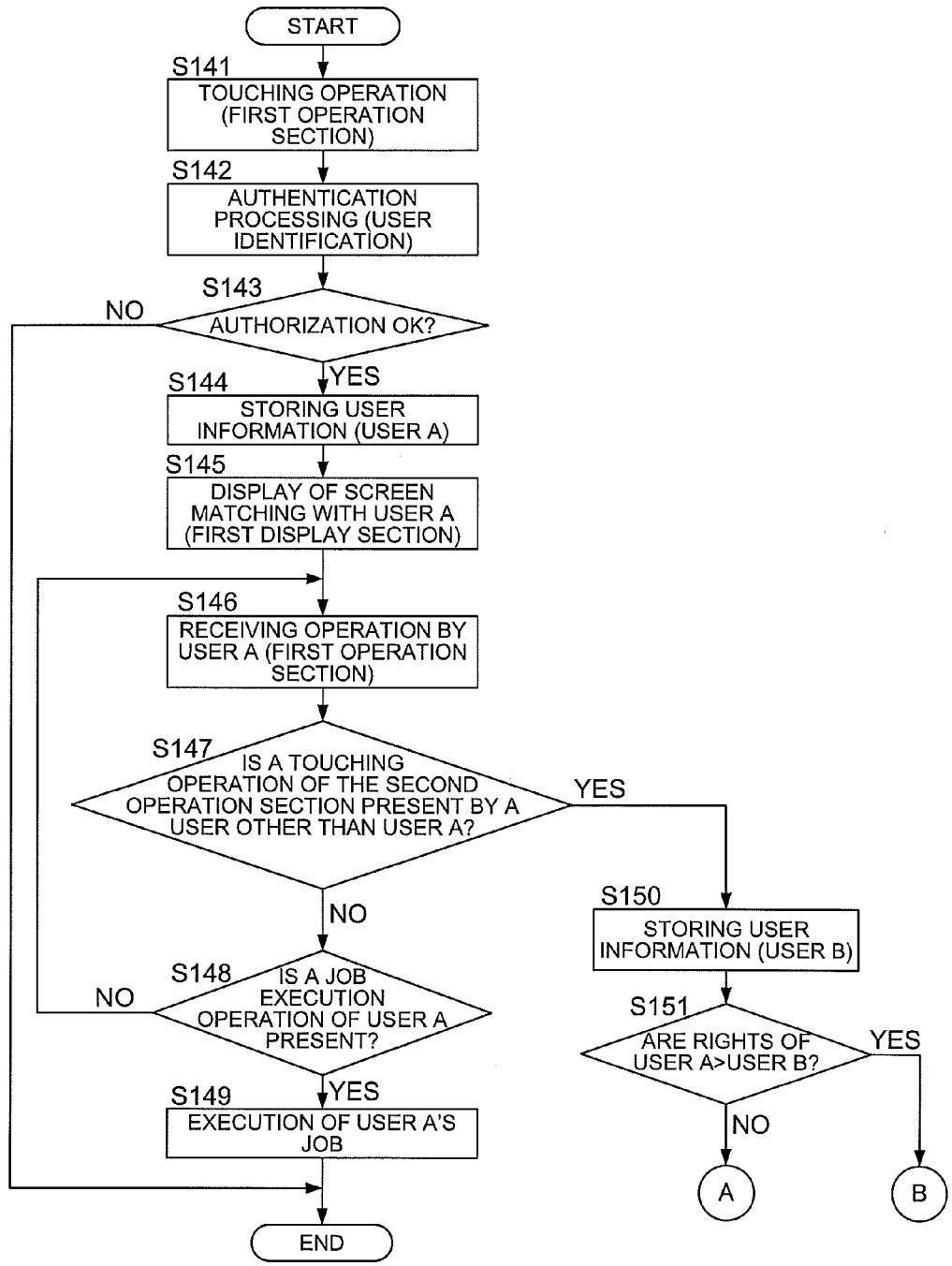
FIG. 12 is a flow chart (1/3) showing one example of the control operations in the multifunction peripheral for plural operation sections, plural user individual authentication/simultaneous operation.
Figure 13:
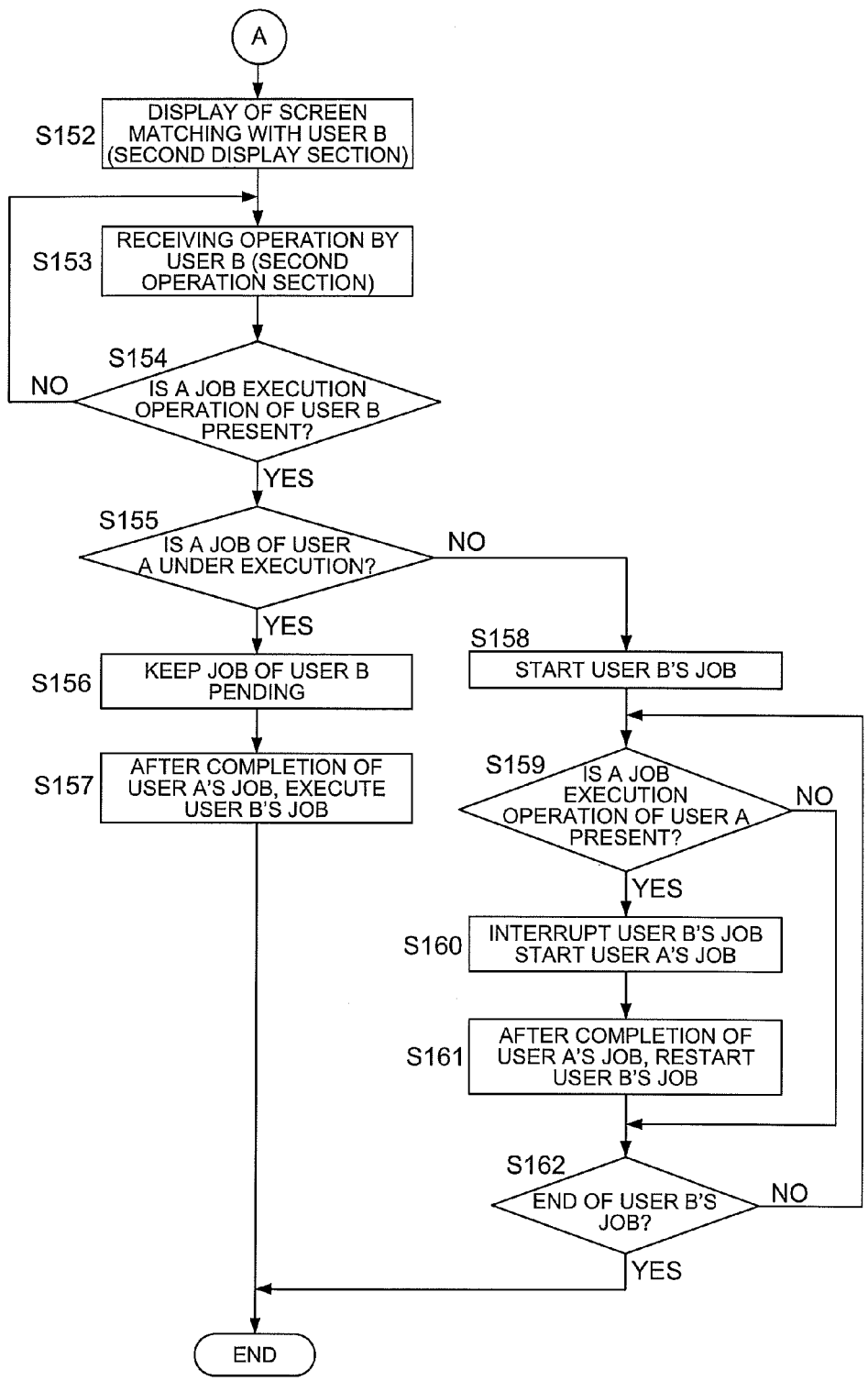
FIG. 13 is a flow chart (2/3) showing one example of the control operations in the multifunction peripheral for plural operation sections, plural user individual authentication/simultaneous operation.
Figure 14:
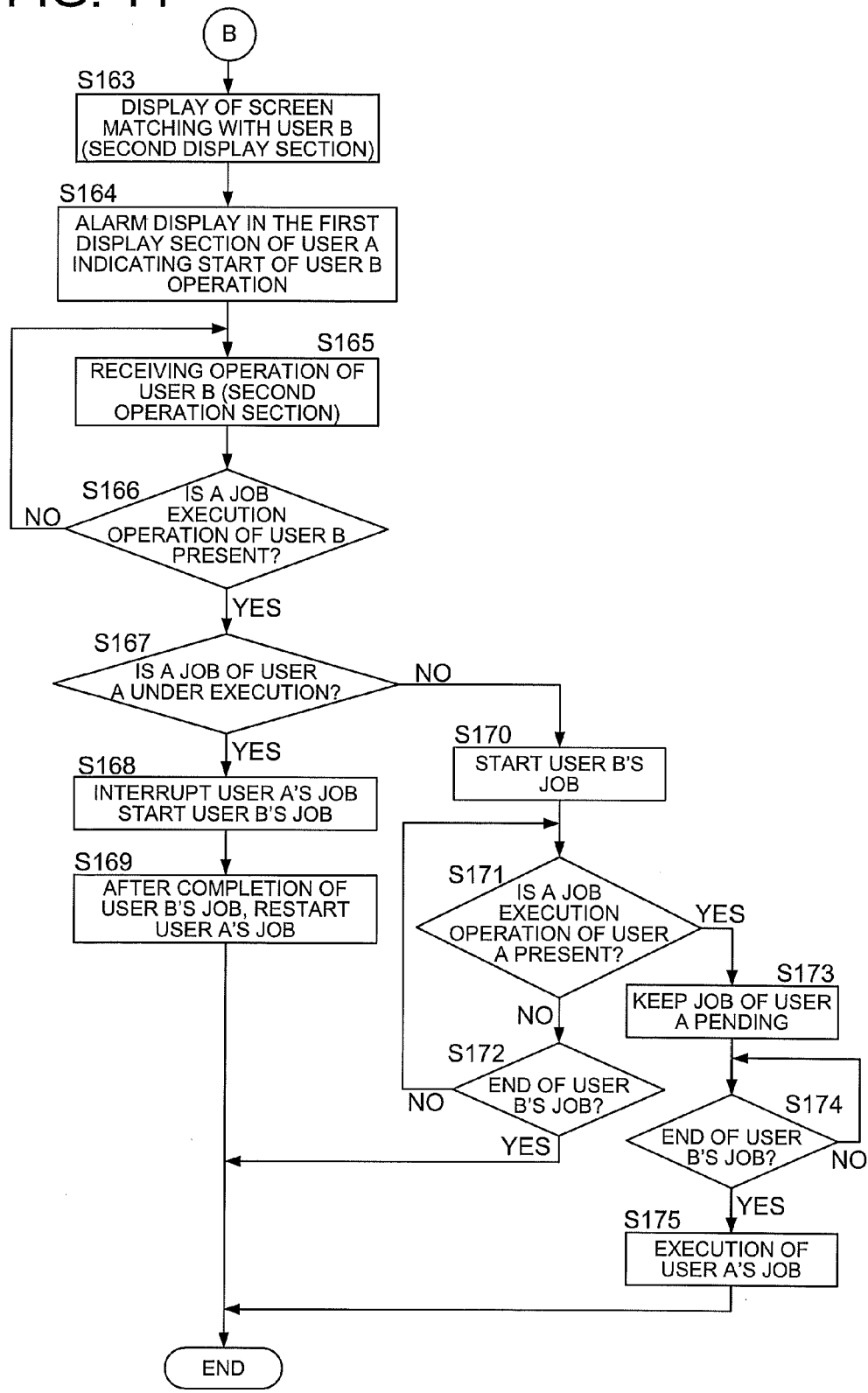
FIG. 14 is a flow chart (3/3) showing one example of the control operations in the multifunction peripheral for plural operation sections, plural user individual authentication/simultaneous operation.

Example of Control Operations for Multiple Operation Sections—Multiple Users Individual Authentication/Simultaneous Operation:

FIG. 12 to FIG. 14 show the control operations for individual authentication and simultaneous operation by multiple users in multifunction peripherals 60, 70, and 80 provided with a plurality of operation sections of the above examples.

Here, the case is explained in which User A carries out in the first operation section an operation of printing after carrying out preview display or editing of the document files stored in the multifunction peripheral, and User 13 carries out in the second operation section the operation of copying.

Further, although it is not possible to carry out simultaneously the print output operation of the different operations regarding these two types of simultaneous operations (exclusive control), which one is to be given priority is being determined by comparing the priorities (rights) determined in advance for the users and based on the result of that comparison, similar to the control operations for interrupting operations explained with reference to FIG. 7, and when the priority levels are the same, the job that is already being executed is given priority.

Further, although similar control operations can be made in any one of the multifunction peripherals 60, 70, and 80, the explanations are given here taking the example of the multifunction peripheral 60.

The multifunction peripheral 60 (or the multifunction peripherals 70 or 80), at the time a touching operation is received by a user in the first operation section 62 (the operation of touching the touch panel) (Step S141), receives the authentication data from the terminal apparatus 40 carried by the user through a communication path that includes the human body of the user, and carries out authentication processing based on that authentication data (Step S142). When authentication is not possible (NO in Step S143), the multifunction peripheral 60 does not permit the user to use the peripheral and ends this operation (END).

When authentication is permitted (YES in Step S143), for example, if the User A is authenticated at this point, the multifunction peripheral 60 permits its use by the User A. Subsequently, the multifunction peripheral 60 stores the information of User A (the control operations and the management table for User A) (Step S144), and displays the screen suitable for the User A (preview display, editing screen, etc.,) in the first display section 61 (Step S145), and accepts the different operations by User A from the first operation section 62, here, the operations of preview display or editing of a document file stored in the multifunction peripheral 60 (Step S146).

The multifunction peripheral 60, while an operation of the first operation section 62 by User A is being received, monitors whether to accept a touching operation of the second operation section 64 (Step S147), and without receiving such a touching operation (NO in Step S147), upon receiving a job execution operation by User A in the first operation section 62, in the case here, upon receiving the instruction operation of printing a document file (YES in Step S148), the multifunction peripheral 60 executes that job (Step S149), and ends this operation (END).

While an operation by User A has been accepted, if a touching operation by a user other than User A is received (YES in Step S147), for example, here, if a touching operation by the User B of the second operation section 64 is received, the multifunction peripheral 60 stores the information of User B (the control operations and the management table for User B) (Step S150), and compares the rights of User B with the rights of User A (Step S151). If the rights of User B are the same or lower in level than the rights of User A (NO in Step S151), the operation transits to Step S152 of FIG. 13. If the rights of User B are higher in level than the rights of User A (YES in Step S151), the control of the operation transits to Step S163 of FIG. 14.

In Step S152 of FIG. 13, the multifunction peripheral 60 displays screens matching with User B (copy settings screens, etc.,) in the second display section 63 (Step S152), and receives the different types of operations by User B from the second operation section 64, here, receives the different types of setting control operations related to copying (NO in Step S153 to Step S154). Subsequently, when the multifunction peripheral 60 receives the job execution operation (the copy instruction operation by pressing the Start button) by User B from the second operation section 64 (YES in Step S154), if a job of User A (the job of printing a document file) is currently being executed (YES in Step S155), puts the job instructed by User B in the standby state (Step S156), after the completion of execution of the job of User A, executes the job of User B that is in the standby state (Step S157), and ends this operation (END).

If a job of User A is not being executed (NO in Step S155), the multifunction peripheral 60 starts the job instructed by User B (Step S158), and during the execution of this job of User B monitors whether to accept a job execution operation by User A from the first operation section 62 (NO in Step S159 to NO in Step S162). Next, without receiving that operation from User A (NO in Step S159), if the job of User B is completed (YES in Step S162), this processing is ended (END).

If the above operation by User A is received during the execution of the job of User B (YES in Step S159), the multifunction peripheral 60 suspends the job of User B, and starts the job instructed by User A (Step S160). The multifunction peripheral 60, when the job of User A is completed, resumes the suspended job of User B (Step S161), and after the resumption of the job of this user B, again monitors whether to accept a job execution operation by User A from the first operation section 62 (NO in Step S159 to NO in Step S162). Next, without receiving that operation from User A (NO in Step S159), if the job of User B is completed (YES in Step S162), this processing is ended (END).

In Step S163 of FIG. 14, the multifunction peripheral 60 displays a screen matching with User B (copy settings screen, etc.,) in the second display section 63 (Step S163), and receives various types of operations by User B from the second operation section 64, here, receives the operations of various settings related to copying (Step S165 to NO in Step S166).

Further, in the case of the configuration in which the first operation section (the first display section) is connected wirelessly to the apparatus body (see FIG. 11), between Step S163 and Step S165, in that wireless type first display section that is currently being used by User A, a warning message is displayed indicating that an interrupting operation by another user (User B in this case) has been started (Step S164). Because of this, even in the case in which the User A is operating the first operation section at a place distant from the multifunction peripheral 60 (apparatus body 60a), the user can gasp that another user is using the multifunction peripheral 60 at the same time. In addition, it is possible to make this warning display even when the first operation section is not of the wirelessly connected type.

Next, if the multifunction peripheral 60 receives the job execution operation (the copy instruction operation by pressing the Start button) by User B from the second operation section 64 (YES in Step S166), if a job of User A (the job of printing a document file) is currently being executed (YES in Step S167), suspends that job of User A, and starts the job instructed by User B (Step S168). When the execution of the job of User B is completed, the multifunction peripheral 60 resumes the suspended job of User A (Step S169), and when that job of User A is completed, ends this operation (END).

If a job of User A is not being executed (NO in Step S167), the multifunction peripheral 60 starts the job instructed by User B (Step S170), and during the execution of this job of User B monitors whether to accept a job execution operation by User A from the first operation section 62 (NO in Step S171 to NO in Step S172). Next, without receiving that operation from User A (NO in Step S171), when the job of User B is completed (YES in Step S172), this processing is ended (END).

If the above operation by User A is received during the execution of the job of User B (YES in Step S171), the multifunction peripheral 60 puts the job instructed by User A in the standby state (Step S173), and when the job of User B is completed (YES in Step S174), executes the job of User A that had been put in the standby state (Step S175), and ends this operation (END).

Further, although an example of the case in which it is possible to execute in parallel the screen display and operations themselves of User A and User B was explained here, when they cannot be executed in parallel, it is also possible to switch the screen display control and the operation reception control based on the result of comparison of the priority level (rights).

For example, if the priority level of User A is higher, in Step S152 of FIG. 13, the screen display competing with User A is not made in the second display section used by User B, and instead, it is possible to display a message (notifying screen) indicating that it is not possible to display because a user with a higher priority level (User A) is using that screen, or to display some other screen. In addition, although a screen competing with User A is displayed in the second display section of User B, in Step S153 an operation competing with User A is not accepted in the second operation section of User B, and it is also possible to display at the same time a message indicating the fact that it is not possible to operate because a user with a higher priority level (User A) is making a competing operation. Further, in this type of screen display waiting state or operation waiting state, when the use of competing screen or a competing operation by User A ends, it is possible to release that waiting state, and to display a screen matching with User B in the second display section, or to accept an operation by User B in the second operation section.

On the contrary, if the priority level of User B is higher, in Step S164 of FIG. 14, it is possible, as a warning message in the first display section used by User A, after displaying, for example, a message indicating that display is not possible because a user with a higher priority level (User B) has started using that competing screen, or a message indicating that operation is not possible because such a user has started a competing operation, and to go into the suspended state by either erasing that display screen or by transiting to a different screen. In addition, in such a suspended state, when the use of a competing screen or a competing operation by User B is ended, it is also possible to release that suspended state, and to display again the screen released by User B in the first display section, or to make the suspended operation to be continued to be received from User A in the first operation section.

In this manner, in the multifunction peripherals 60, 70, or 80, since it is possible to carry out user authentication individually using human body communication for each touching operation of the plurality of operation sections by a plurality of users, and to identify each user and their different operations based on the authentication data received from the terminal apparatus 40 carried by each user, as in the control operations in the present example, it is possible to accept the different operations at the same time (simultaneous operation) of the plurality of identified users (User A and User B).

In addition, when it is not possible to execute in parallel the different control operations due to those simultaneous operations, it is possible to determine the priority order of those different operations based on the result of comparing the priority levels (rights) determined in advance for each of that plurality of users, and to carry out control of the different control operations according to that priority order. Because it is possible to carry out simultaneous operations by a plurality of users using a plurality of operation sections in this manner, it is possible to enhance the operation efficiency and the convenience. In addition, it is possible to increase the operation rate of the multifunction peripheral and to increase the productivity.

Example of Control Operations for Multiple Operation Sections Multiple Users Simultaneous Authentication/Coordinated Operations:

In a multifunction peripheral provided with a main unit and a plurality external or other operation sections (operation panels), it is also possible to carry out controls other than the individual authentication of the above plurality of users and of the control operations for simultaneous operations. For example, it is even possible to carry out the control of operations associated with simultaneous authentication due to a plurality of users, in detailed terms, the controls related to the prescribed operations for which a plurality of users have to make coordinated operations (coordinated control), etc., and such control operations are explained here.

When simultaneously authenticating two users, for example, since one of the users can be authenticated by touching any part other than an operation member in one of the operation panels of the multifunction peripheral, it is possible for the other user to execute an operation after user authentication is carried out by operating an operation member in the other operation panel in that state. Further, it is also possible to carry out the control for prescribed operations by multiple users in a multifunction peripheral having only one operation panel (operation section). In that case, in order to avoid the operability becoming lower due to a plurality of users coming into close proximity with the operation panel, it is also possible to have a configuration in which at a location other than the operation panel, for example, on the side surface of the apparatus body, etc., is provided an electrode sheet and an electric field sensor for receiving touching operations and carrying out human body communication with the terminal apparatus 40 of users, and one of the above users is authenticated by making a touching operation to this specific location.

Figure 15:
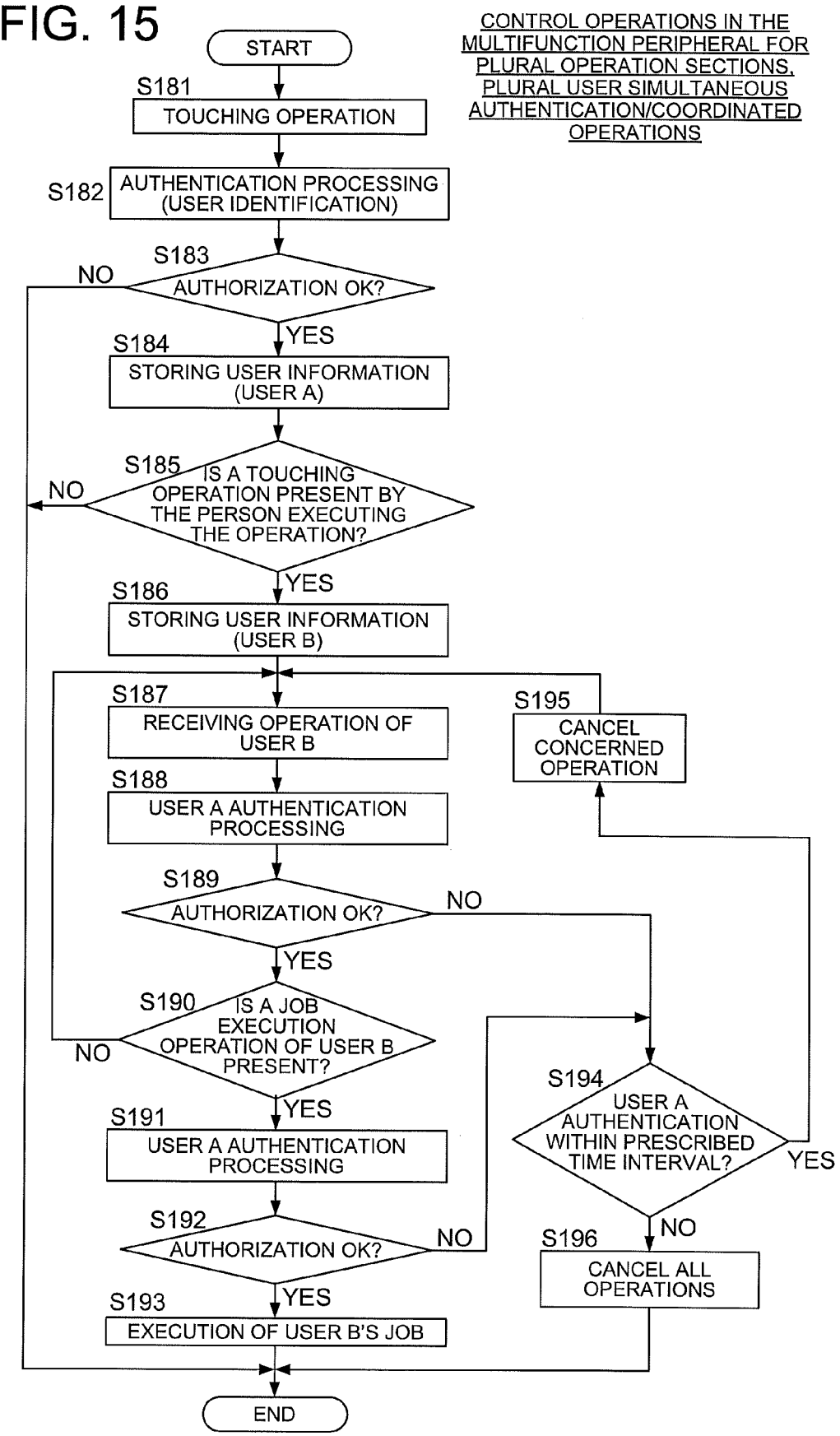
FIG. 15 is a flow chart showing one example of the control operations in the multifunction peripheral for plural operation sections, plural user simultaneous authentication/coordinated operations.

FIG. 15 shows the control operations for simultaneous authentication and coordinated operation (joint work) by a plurality of users in a multifunction peripheral provided with a plurality of operation sections. Here, explanation is given of the case in which a coordinated operation is made wherein, User A is an operation approving person and User B is an operation executing person, under the observation of User A who is in the authenticated state. User B carries out operations that include authentication (data input, setting, job execution, etc.), and User A authorizes by observing the contents of that operation until the end, and the User B completes the operation. This kind of coordinated operation can be, for example, an operation such as the operation for preventing erroneous facsimile transmission that cannot be made without approval to prevent erroneous facsimile transmission of confidential documents due to entering a wrong number of due to changing the destination number, or the operation of printing out a confidential document that cannot be output without approval, etc. In addition, explanations are given here taking the example of the multifunction peripheral 60.

In the multifunction peripheral 60, when a touching operation by a user of the operation section (any location other than an operation member) is received (Step S181), authentication data is received from the terminal apparatus being carried by the user via a communication path that includes the human body of the user, and authentication processing is carried out based on that authentication data (Step S182). When authentication is not possible (NO in Step S183), the multifunction peripheral 60 does not permit the user to use the peripheral and ends this operation (END).

When authentication is possible (YES in Step S183), for example, here, if a User A who is the operation approving person is authenticated due to an operation of touching one of the operation sections (for example, the first operation section), the multifunction peripheral 60 stores the information of User A (control operations for User A, management table, etc.,) (Step S184). Subsequently, monitoring is made as to whether a touching operation is received of another operation section (for example, the second operation section) by User 13 who is the person executing the operation, and when such a touching operation is not received (NO in Step S185), for example, when an operation of touching the operation section by the User B cannot be detected even when a prescribed time duration has elapsed, this processing is ended (END).

When an operation of touching the operation section by the User B is detected (YES in Step S185), the multifunction peripheral 60 stores the information of User B (control operations for User B, management table, etc.,) (Step S186), and receives from the operation section an operation by User B that requires approval by User A (Step S187). Thereafter, the multifunction peripheral 60 carries out authentication processing for User A (user authentication) at fixed intervals of time until the operation by User B is completed (Step S188→YES in Step S189→NO in Step 189→Step S187).

If the authentication of User A becomes not possible before the operation of User B has been completed (NO in Step S189), that is, if it is no longer possible to receive authentication data of User A because the User A has removed the hand from one of the operation sections, the multifunction peripheral 60 temporarily suspends the reception of operation by User B from the other operation section, and monitors if the User A can be authenticated again before a prescribed period of time has elapsed.

If User A can be authenticated again within the prescribed period of time, that is, when it was possible to detect the operation by User A of touching one operation panel (YES in Step S194), the multifunction peripheral 60 cancels the operation received from User B that was received just before the time when User A could no longer be authenticated (Step S195), and the control returns to Step S187. If User A can not be authenticated within the prescribed period of time, that is, if it was not possible to detect the operation by User A of touching one operation panel (NO in Step S194), the multifunction peripheral 60 cancels all the operations received from User B (Step S196), and ends this operation (END).

Further, the multifunction peripheral 60, when it receives a job execution operation by User B from the other operation section (YES in Step S190), carries out authentication processing (user authentication) of User A, and confirms if it is possible to authenticate User A at the time of the execution operation of this job (Step S191). If User A cannot be authenticated (NO in Step S192), the control goes on to Step S194, and if User A can be authenticated within a prescribed period of time (YES in Step S194), it cancels only the job execution operation that was received last from User B (Step S195), and the control returns to Step S187. If User A cannot be authenticated within a prescribed period of time (NO in Step S194), the multifunction peripheral 60 cancels all the operations received from User B (Step S196), and ends this operation (END).

Further, if User A can be authenticated at the point of time when a job execution operation is received from User B (YES in Step S192), the job instructed by User B is executed (Step S193), and this processing is ended (END).

Further, although the case was explained here of the example when the person approving the operation (User A) monitors until the end and approves the contents of operation by the person executing the operation (User B) (simultaneous authentication/coordinated operations), apart from this method of approval, it is also possible to use a method of approval in which the person approving the operation confirms and approves (carries out the approval operation) the contents of the operation (setting state, input data, etc.,) by the person executing the operation in the end (individual authentication/coordinated operations).

In this manner, in the control operation of the present example, regarding a prescribed operation for which a plurality of users have to carry out coordinated operations, whether or not such coordinated operations are being made will have to be inspected based on the result of carrying out user authentication (user identification result) in coordination with the detection of operation of the operation sections. In such prescribed operations, by inspecting the coordinated operations by a plurality of users, it is possible to eliminate operation errors or illegal independent operation by a single operator. In addition, because it is possible to carry out prescribed operations by such coordinated operations, the variations become numerous of operations by a plurality of operators and the convenience becomes enhanced.

Further, in the simultaneous authentication/coordinated operations of the present example, for the multifunction peripheral to recognize that the person approving the operation is constantly monitoring the contents of operations by the person executing the operation, this recognition is being made by detecting that the person approving the operation is touching own unit (operation section) by carrying out user authentication using human body communication. In this manner, even if the person approving the operation is not touching the multifunction peripheral, because of the configuration shown in FIG. 6 of providing an authentication area (58) in the periphery of the multifunction peripheral, it is also possible to make the multifunction peripheral detect by carrying out user authentication of the person approving the operation standing in the authentication area. In this case, since it is sufficient for the person approving the operation to merely stand in the authentication area it is possible to reduce the work load. The configuration shown in FIG. 6 is ideally suitable for such simultaneous authentication/coordinated operations.

Example of Control Operations for Multiple Operation Sections—Individual User Continuation Operation:

In a multifunction peripheral provided with a main unit and a plurality external or other operation sections (operation panels), since it is possible to carry out user authentication for each of the operation sections, for example, it is also possible, during the management of control operations for an operation made by a user in a first operation section, to receive an operation made by that user in a second operation section as an operation by that user for the control operations that are currently being managed. The taking over of operations (continuation) among a plurality of operation sections in this manner, for example, can be taking over the operations of a plurality of processes in one job among a plurality of operation sections. Such control operations are explained here.

Figure 16:
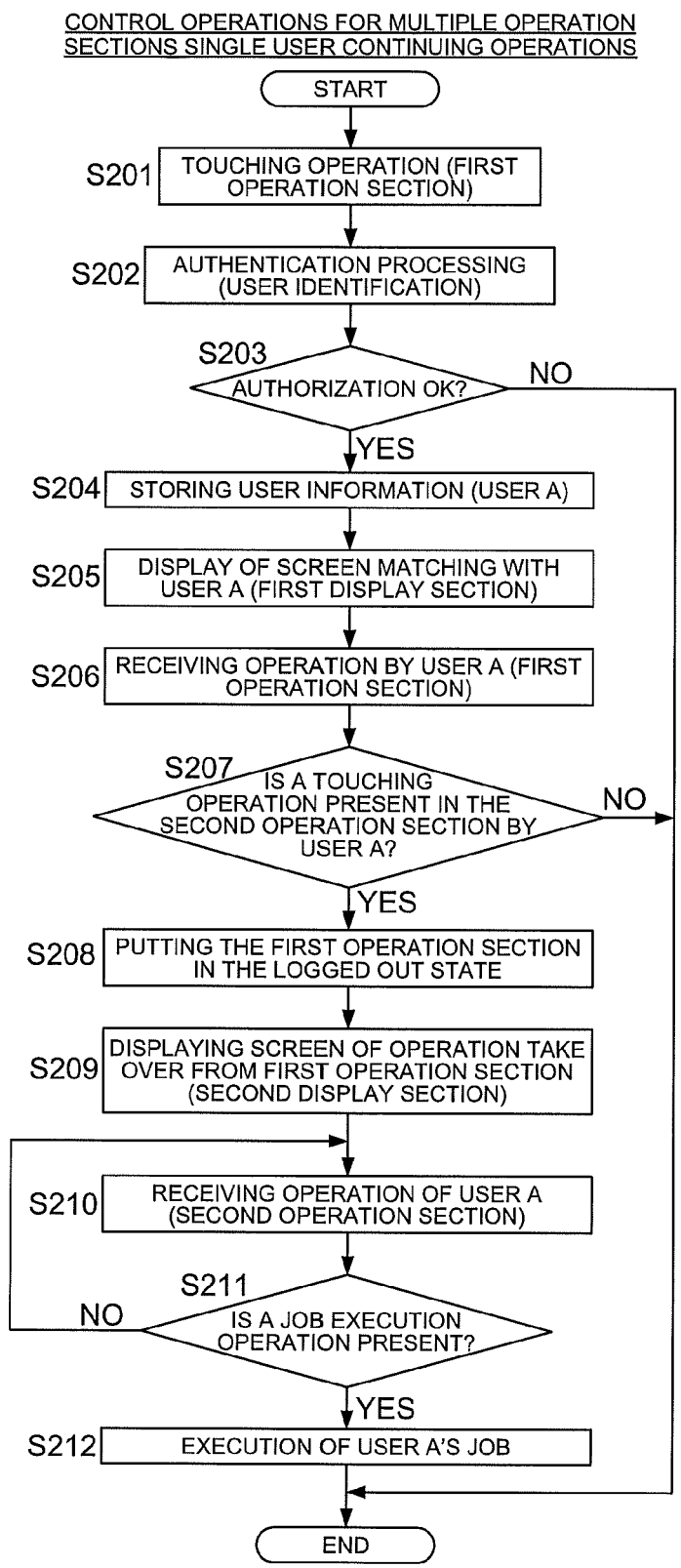
FIG. 16 is a flow chart showing one example of the control operations in a multifunction peripheral for single user continuing operations in plural operation sections.

FIG. 16 shows the control operations (continuation control) for continuation operations (take over operation) among different operation sections by a single user in a multifunction peripheral provided with a plurality of operation sections. Here, the case is explained in which a User A carries out image file editing operations in an externally connected operation section (the large size first operation section), after that, carries out in continuation operation in an operation section in the apparatus main unit (the small size second operation section) of outputting that image file (printing, facsimile transmission, distribution) or of saving. In addition, explanations are given here taking the example of the multifunction peripheral 60.

In the multifunction peripheral 60, when a touching operation by a user of the first operation section 62 is received (Step S201), authentication data is received from the terminal apparatus being carried by the user via a communication path that includes the human body of the user, and authentication processing is carried out based on that authentication data (Step S202). When authentication is not possible (NO in Step S203), the multifunction peripheral 60 does not permit the user to use the peripheral and ends this operation (END).

When authentication is possible (YES in Step S203), for example, here, if a User A is authenticated, the multifunction peripheral 60 permits the User A to use it. Subsequently, the multifunction peripheral 60 stores the information of User A (control operations for User A, management table, etc.,) (Step S204), and displays a screen matching with User A (editing screen, etc.) in the first display section 61 (Step S205), and receives from User A via the first operation section 62 operations for editing an image file stored in the multifunction peripheral 60 (Step S206).

The multifunction peripheral 60, when it does not receive the operation by the User A via the first operation section 62 of end of image file editing, or has received the operation of end of editing but has not received a touching operation in the second operation section 64 (NO in Step S207), ends this operation (END).

When the multifunction peripheral 60 receives the operation by the User A via the first operation section 62 of end of image file editing, and thereafter, receives a touching operation in the second operation section 64 by that User A (YES in Step S207), the multifunction peripheral 60 releases the first operation section 62 (the first display section 61) by putting it in the logged out state (Step S208), displays in the second display section 63 the screen of operation take over from the first display section 61 (Step S209). In the operation take over screen, for example, the image file whose editing has been ended is in the state of having been selected (specified) as the target of processing, etc.

Here, the multifunction peripheral 60 receives various operations from User A via the second operation section 64 related to outputting the above file (Step S210 to NO in Step S211). Subsequently, when the multifunction peripheral 60 receives from User A via the second operation section 64 a job execution operation (YES in Step S211), it executes the job of User A (output of image file) (Step S212), and ends this operation (END).

Further, although the case was explained here of taking over the operations from the first operation section 62 by the second operation section 64, the method of taking over operations need not be limited to this. For example, it is also possible to take over the operations to and from between two operation sections, or to take over operations among three or more operation sections.

In this manner, in the control operations of the present example, since it is possible for a specific user to take over in a second operation section the control operations that are currently under management for the operations made via a first operation section (continuation), that is, since it is possible to make control operations for an operation under management by taking over among different operation sections, the variations become numerous of operations in a plurality of operation sections and the convenience becomes enhanced. In addition, since this does not mean that a single user is occupying several operation sections at the same time, a released operation section can be used by other users, and the efficiency of operation (productivity) by a plurality of users increases.

In the above, although a preferred embodiment of the present invention was explained with reference to the drawings, the concrete configuration need not be restricted to this preferred embodiment, and any modifications or additions made without deviating from the scope of the present invention shall be included in the present invention.

For example, in the preferred embodiment described above, in a multifunction peripheral provided with the user authentication function, although an example was explained in which the users related to the operations in the operation sections and the operations for each user are identified and recognized by carrying out user authentication by communicating with the terminal apparatus of the user, it is also possible to have a configuration in which user authentication is not made. In other words, it is possible to have a configuration in which communication with the terminal apparatus of the user us made, but only user identification is made without carrying out user authentication, and the users related to the operations in the operation sections and the operations for each user are identified and recognized.

Further, although user identification (authentication) was being made for each of the detections of operations in the operation sections, it is also possible to change this according to the number of detections of operations or the detection location, etc. In the case of the number of detections, it is also possible to carry out identification, after the first operation detection, for every second or every third detections of operation. In the case of detection location, it is possible to set up conditions such as every detection of operation or after every N-th detections of operations for each detection location, and to carry out identification according to those conditions. When a plurality of operation buttons (soft buttons) is displayed in the touch panel, it is also possible to set up the above conditions for each of those operation buttons.

Further, in simultaneous operations by a plurality of users, for example, it is also possible to have a configuration in which a single large sized screen in a large size operation section is divided into segments which are allocated for the different users, and to receive operations by each user for each segmented screen. In addition, such segmentation of the screen can be made to be carried out automatically when another user touches the screen (touch panel) while a single user is using the screen.

According to the above embodiment, the communication section of the information equipment apparatus can take the human body of the operator related to an operation of the operation section as the communication path, and can carry out communication with the terminal apparatus storing the identification data of that user. The operator related to an operation of the operation section here, includes a person operating an operation section or a person intending to operate an operating section. The terminal equipment is worn (being affixed to a wrist watch, etc.) by that operator and is directly touching the body of the person, or is carried by the operator and indirectly touches the body of the person via the clothes of the person, etc., and can carry out communication with an information equipment apparatus using the human body of the operator as the communication medium.

In such communication (human body communication) using the human body as the communication path, the control section of the information equipment apparatus, in coordination with the detection of an operation by the operator in the operation section (receipt of an operation), communicates with the terminal apparatus and identifies the operator based on the identification data. The identification of the operator in coordination with the detection of an operation here includes the cases when the identification operation (identification processing) is changed according to the number of times of detections of operations or the location of detection, etc. For example, this includes the operation of setting up conditions such as, (1) identifying the operator for each detection of operation, (2) identifying the operator for every N detections of operations, (3) condition (1) or (2) for every detection location, and identifying the operator according to those conditions. Further, the control section of the information equipment apparatus, according to the result of identification of the operator in coordination with this detection of operation, controls the control operations for each operation.

Because of this, while managing the operation related to the operator who made the previous operation, it is possible to identify the operator who made a new operation (for every operation or for N operations), and to control the control operations related to that operation according to that identified operator. For example, it is possible to carry out controls such as, when identification is not possible, by not making the operations for the new operation (by not accepting the operation), or when identification is possible, by carrying out control operations for the new operation (by accepting the operation), or to accept or reject the operation or to carry out the operation corresponding to the new operator depending on whether the previous and new operators are the same, that is, according to whether the same operator is continuing to make operations/whether or not there is a change in the operator, etc.

Further, the information equipment apparatus can identify the operator by merely receiving an operation of the operation section by the operator. From the point of view of the operator, the operator is identified (recognized) by the information equipment apparatus by merely making the desired operation in the operation section without having to make separately the authentication operation of authentication releasing operation such as the conventional individual person authentication.

Because of this, without having to switch the operator recognition state between operations by carrying out special operations, it is possible to carry out control operations corresponding to the operator of the received operation. In addition, when this configuration is adopted for individual person authentication (user authentication), it is possible to carry out individual person authentication of the operator (user) in coordination with the detection of an operation of the operation section, and according to the result of that authentication, to carry out control of the control operations related to that operation. In this case, not only special control operations related to the above authentication are not required, but also, not accepting operations by persons other than the authenticated user, or switching the operations for every authenticated user (automatic switching of the authentication state and operation in coordination with the detected operation), etc., become possible. Because of this, while enhancing the operability and security in individual person authentication, the convenience is increased because it is possible to carry out control operations according to the operator of the received operation.

In the above embodiment, while establishing correspondence with the operator identified in coordination with the detection of operation of an operation section, the control operations related to the operation received from that operator are managed, and the operator of an operation received newly during the management of these control operations is identified. Because of this, even without temporarily stopping an operation that is currently being managed, an operator making a new operation is identified (recognized) by the information equipment apparatus, and the control of the control operation corresponding to that operation is carried out.

In the above embodiment, the control operations for a newly received operation when there are control operations that are currently under management are changed (controlled) depending on whether or not the operator who made that new operation and the operator related to the control operations that are currently under management are the same.

In the above embodiment, when the operator (the first operator) who made the new operation and the operator (the second operator) related to the control operations that are currently under management are not the same, that is, when the operator making a new operation is changed from the operator of the control operations that are currently being managed, the management of the control operations that were being managed before the change in the operator is cancelled and the management of the control operations related to the new operator is started. In such switching of the operator, while maintaining the security of the operation that was being managed before the switching of the operator, the operability can be enhanced for the new operator.

In the above embodiment, when there is a change from the operator (the second operator) related to the control operations that are currently under management to the operator (the first operator) who made the new operation, the priority levels of these two operators are compared, and based on the result of that comparison, the control operations related to one of the operators is executed on a priority basis. In such switching of operators, because of automatically executing on a priority basis based on the priority levels of the operators one of the control operations that are currently being managed and the control operations for the new operation, the operability and convenience become enhanced.

In the above embodiment, when there is a change from the operator (the second operator) related to the control operations that are currently under management to the operator (the first operator) who made the new operation, and when the control operations for that new operation and the control operations currently being managed are control operations that can be executed simultaneously, these control operations are executed in parallel. By making it possible to execute in parallel the control operations for that new operation and the control operations currently being managed in this manner, the operation efficiency and convenience are increased.

In the above embodiment, regarding a prescribed operation for which a plurality of users have to carry out coordinated operations, whether or not such coordinated operations are being made are inspected based on the result of carrying out user authentication in coordination with the detection of operation of the operation sections. In such prescribed operations, by inspecting the coordinated operations by a plurality of users, it is possible to eliminate operation errors or illegal independent operation by a single operator. In addition, because it is possible to carry out prescribed operations by such coordinated operations, the variations become numerous of operations by a plurality of operators and the convenience becomes enhanced.

In the above embodiment, since it is possible to accept operations individually from a plurality of operators through a plurality of operation sections, it is possible to increase the efficiency of operations by a plurality of users and to increase the apparatus operation rate.

In the above embodiment, since it is possible for a specific user to take over in a second operation section the control operations that are currently under management for the operations made via a first operation section (continuation), that is, since it is possible to make control operations for an operation under management by taking over among different operation sections, and the convenience is enhanced.

In the above embodiment, using an operation section that is configured as a separate unit from the apparatus body and is connected by wireless communication, remote operations of the information equipment apparatus become possible, and the convenience is enhanced.

In addition, in the above embodiment, the communication section of the information equipment apparatus can carry out communication with the terminal apparatus using the human body of the operator related to an operation of the operation section as the communication path. The operator related to an operation of the operation section here, includes a person operating an operation section or a person intending to operate an operating section. The terminal equipment is worn (being affixed to a wrist watch, etc.) by that operator and is directly touching the body of the person, or is carried by the operator and indirectly touches the body of the person via the clothes of the person (placed in close proximity), etc., and can carry out communication with an information equipment apparatus using the human body of the operator as the communication medium.

In this type of communication using the human body as the communication path (human body communication), between the communication section of the information equipment apparatus and the terminal apparatus, a communication path that includes the human body of the operator is formed by an antenna that is connected to the communication section and that is placed at a prescribed position. For example, in the method of forming the communication path only by the contact between the antenna and the human body, it is desirable that the antenna is placed at an operation location at which it is touched the human body (finger tip, etc.,) at the time an operation is made by the operator in the operation section. In the method in which the communication path is formed even merely by the human body and the antenna coming close, it is possible to place the antenna in the operation locations, or can be placed in the vicinity (periphery) of an operation location.

The information equipment apparatus, through the communication path that includes the human body of the operator and that is formed by the antenna between the communication section and the terminal apparatus, for example, can communicate with the terminal apparatus in which is stored the identification data of the operator, and can identify the operator.

In this manner, as an interface with the operator for identifying the operator related to the operation in the operation section, for example, even without making the configuration complex such as providing sensors that obtain biometric information such as fingerprints, etc., in all the operation members of an operation section provided with a large number of operation members, in identifying an operator using human body communication, it is possible to make the configuration simple of merely providing the above antenna.

Further, because of this type of a simple configuration, it becomes possible to recognize while distinguishing between an operation by an authenticated user and other operations, for example, an operation by another user or an erroneous operation caused by some object touching an operation member, and it is possible to prevent erroneous recognition of operations.

In the above embodiment, the communication section of the information equipment apparatus can carry out communication with the terminal apparatus using the human body of the operator related to an operation of the operation section as the communication path. The operator related to an operation of the operation section here, includes a person operating an operation section or a person intending to operate an operating section. The terminal equipment is worn (being affixed to a wrist watch, etc.) by that operator and is directly touching the body of the person, or is carried by the operator and indirectly touches the body of the person via the clothes of the person (placed in close proximity), etc., and can carry out communication with an information equipment apparatus using the human body of the operator as the communication medium.

In the above invention, even in an operation panel having a touch panel or buttons as the operation members, with a simple configuration of placing the antenna on the surface of the operation panel, because it becomes possible to carry out human body communication with the terminal apparatus of the operator operating the touch panel or the buttons, it becomes possible to prevent erroneous recognition of operations.

In the above invention, when the operator is operating an operation member, the human body (finger tip, etc.,) of the operator touches the antenna placed so as to cover the operation members. The communication path is formed at the time of making an operation due to this touching or close proximity between the human body and the antenna, and communication becomes possible.

In the above embodiment, when the operator is operating an operation member, the human body (hand, or fingers, etc.,) of the operator comes into close proximity with the antenna placed in the periphery the operation members. The communication path is formed at the time of making an operation due to this close proximity between the human body and the antenna, and communication becomes possible. Further, although there may be concern that the operability or visibility of the operation members decreases when the antenna is placed so as to cover the operation member, it is possible to eliminate such concerns by placing the antenna on the periphery of the operation members.

In the above embodiment, the information equipment apparatus, with a simple configuration of merely placing an antenna at the position at which the operator stands in the vicinity of the apparatus body, it is possible to carry out human body communication with the terminal apparatus of an operator related to the operation of the operation section.

In the above embodiment, the variations in the electric potential induced in the antenna by the electric field on the human body can be detected by a communication section having the function of an electric field sensor, and it is possible to take out obtain an electrical signal form the electric field on the human body. Because of this, in the method of carrying out communication by generating an electric field on the surface of the human body thereby forming a communication path in the human body, with a simple configuration of merely combining an electric field sensor with the antenna, it becomes possible to carry out human body communication with the terminal apparatus of an operator related to the operation of the operation section, and to prevent erroneous recognition of operations.

According to an information equipment apparatus of the present invention, without carrying out special operations, and without changing the user recognition state between users, it becomes possible to carry out control operations corresponding to the user of the received operation. If it is an information equipment apparatus that carries out user authentication, while enhancing the operability and security of user authentication, the convenience is enhanced because it is possible to carry out control operations corresponding to the user of the received operation.

Further, according to an information equipment apparatus of the present invention, by configuring in a simple manner the interface with the user for identifying the user, it is possible to prevent erroneous recognition of operations.

The information equipment apparatus according to the present invention (image forming apparatus) need not be restricted to a multifunction peripheral explained in the preferred embodiment, but this invention can be applied to an image forming apparatus such as copying machines, printers, facsimile machines, etc., and to various types of information equipment apparatuses such as an information processing apparatus provided with an operation section, etc.

What is claimed is:

1. An information equipment apparatus comprising:
a first operation section and a second operation section, each of the first and second operation sections having a display section and a plurality of operation buttons;
a communication section which carries out communication with a terminal apparatus storing identification data of an operator related to respective operations in the first and second operation sections, by using a human body of the operator as a communication path; and
a control section which, in coordination with a detection of the respective operations in the first and second operation sections, executes an identification of a first operator based on the identification data by carrying out communication with the terminal apparatus via the communication section, and according to a result of the identification, controls a control operation corresponding to the operation in the first operation section received from the first operator by correlating to the identified first operator, further executes the identification of an operator of a newly received operation in the second operation section during the control of the control operation by the first operator, and when the operator of the newly received operation in the second operation section is identified as the same operator as the first operator, the control section controls the control operation in the second operation section as a continuation control operation of the control operation in the first operation section by the first operator,
wherein when the operator, of the newly received operation in the second operation section during the control of the control operation by the first operator, is identified as the first operator, the control section releases the first operation section by logging out of the first operator from the first operation section.

2. The information equipment apparatus of claim 1, wherein at least one of the first operation section or the second operation section is configured as a separate unit from an apparatus body of the information equipment apparatus and is connected with wireless communication.

3. The information equipment apparatus of claim 1, wherein the display section of the first operation section is spaced apart from the display section of the second operation section.

4. An information equipment apparatus comprising:
a first operation section and a second operation section, each of the first and second communication sections having a display section and a plurality of operation buttons;
a communication section which carries out communication with a terminal apparatus storing identification data of an operator related to operations in the first and second operation sections, by using a human body of the operator as a communication path; and
a control section which, in coordination with a detection of the operations in the first and second operation sections, executes an identification of a first operator based on the identification data by carrying out communication which the terminal apparatus via the communication section, and according to a result of the identification, controls a control operation corresponding to the operation in the first operation section received from the first operator by correlating to the identified first operator, further executes the identification of an operator of newly received operation in the second operation section during the control of the control operation by the first operator, and when the operator of the newly received operation is identified as the same operator as the first operator, the control section controls the control operation by the first operator in the second operation section as a continuation control operation of the control operation in the first operation section by the first operator,
wherein, in cases where the operator of the newly received operation is not the same as the first operator that is the operator correlated to the control operation being controlled, the control section cancels the control of the control operation correlated to the first operator and starts control of the control operation related to the operator of the newly received operation.

5. An information equipment apparatus comprising:
an operation section;
a communication section which carries out communication with a terminal apparatus storing identification data of an operator related to an operation in the operation section, by using a human body of the operator as a communication path; and
a control section which, in coordination with a detection of the operation in the operation section, executes an identification of the operator based on the identification data by carrying out communication with the terminal apparatus via the communication section, and according to a result of the identification, controls a control operation corresponding to the operation in the operations section,
wherein, in addition to correlating the control operation to an identified operator and controlling the control operation corresponding to the operation received from the identified operator, the control section executes the identification with respect to an operator of a newly received operation during controlling the control operation, and
wherein the control section inspects whether or not coordinated operations are being executed with respect to prescribed control operations, in which a plurality of operators need to execute in coordination with each other.

6. The information equipment apparatus of claim 5, comprising a first operation section and a second operation section, wherein when operations on the first operation section and/or second operation section by a plurality of operators are received, the control section executes identifications of the plurality of operators, and based on the result of the identifications, inspects whether or not coordinated operations are being executed.

7. The information equipment apparatus of claim 5, wherein at least one of the first operation section and the second operation section is configured as a separate unit from an apparatus body of the information equipment apparatus and is connected with wireless communication.

8. A control method of an information equipment apparatus which comprises a first operation section and a second operation section, each of the first and second operation sections having a display section and a plurality of operation buttons, the control method comprising:
carrying out communication with a terminal apparatus storing identification data of an operator related to respective operations in the first and second operation sections, by using a human body of the operator as a communication path;
executing, in coordination with a detection of the respective operations in the first and second operation sections, an identification of a first operator based on the identification data obtained by carrying out communication with the terminal apparatus;
controlling, according to a result of the identification, a control operation corresponding to the operation in the first operation section received from the first operator, by correlating to the identified first operator;
executing the identification of an operator of a newly received operation in the second operation section during the control of the control operation by the first operator;
controlling, when the operator of the newly received operation in the second operation section is identified as the same operator as the first operator, the control operation in the second operation section as a continuation control operation of the control operation in the first operation section by the first operation; and
releasing the first operation section by logging out of the first operator, when the operator of the newly received operation in the second operation section during the control of the control operation by the first operator is identified as the first operator.

9. The control method of claim 8, wherein at least one of the first operation section and the second operation section is configured as a separate unit from an apparatus body of the information equipment apparatus and is connected with wireless communication.

10. The control method of claim 8, wherein the display section of the first operation section is spaced apart from the display section of the second operation section.

11. A control method of an information equipment apparatus, comprising:
carrying out communication with a terminal apparatus storing identification data of an operator related to an operation in the operation section, by using a human body of the operator as a communication path;
executing, in coordination with a detection of the operation in the operation section, an identification of the operator based on the identification data obtained by carrying out communication with the terminal apparatus;
controlling, according to a result of the identification, a control operation corresponding to the operation in the operation section;
executing the identification with respect to an operator of a newly received operation during controlling the control operation, in addition to correlating the control operation to an identified operator and controlling the control operation corresponding to the operation received from the identified operator; and inspecting whether or not coordinated operations are being executed with respect to prescribed control operations, in which a plurality of operators need to execute in coordination with each other.

12. The control method of claim 11, wherein the information equipment apparatus comprises a first operation section and a second operation section, and the control method further comprises:

executing, when operations on the first operation section and/or second operation section by a plurality of operators are received, identifications of the plurality of operators, wherein the inspecting step is executed based on the result of the identifications.

13. The control method of claim 11, wherein at least one of the first operation section and the second operation section is configured as a separate unit from an apparatus body of the information equipment apparatus and is connected with wireless communication.

* * * * *